(12) United States Patent
Izumitani et al.

(10) Patent No.: US 6,533,418 B1
(45) Date of Patent: Mar. 18, 2003

(54) SYSTEM FOR MAKING SPECTACLES TO ORDER

(75) Inventors: Yukihiro Izumitani; Toshihisa Akaba; Isao Iizuka; Yasushi Sakai; Shigeru Watanabe, all of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/423,079

(22) PCT Filed: May 15, 1998

(86) PCT No.: PCT/JP98/02163

§ 371 (c)(1), (2), (4) Date: Nov. 12, 1999

(87) PCT Pub. No.: WO98/52092

PCT Pub. Date: Nov. 19, 1998

(30) Foreign Application Priority Data

| May 16, 1997 | (JP) | ............................................... 9-127614 |
| May 16, 1997 | (JP) | ............................................... 9-127618 |
| May 16, 1997 | (JP) | ............................................... 9-127620 |
| May 16, 1997 | (JP) | ............................................... 9-127624 |

(51) Int. Cl.⁷ ................................................. A61B 3/10
(52) U.S. Cl. ....................................................... 351/204
(58) Field of Search .............................. 351/177, 178, 351/204, 205, 227, 246; 382/282; 33/507, 200

(56) References Cited

U.S. PATENT DOCUMENTS 4,539,585 A    9/1985  Spackova et al.
4,730,260 A    3/1988  Mori et al.
4,852,184 A *  7/1989  Tamura et al. .............. 382/282
5,280,570 A    1/1994  Jordan
5,592,248 A    1/1997  Norton et al.

FOREIGN PATENT DOCUMENTS

| DE | 42 24 922 A1 | 2/1994 |
| JP | 63-110355 | 7/1988 |
| JP | 6-118349 | 4/1994 |
| JP | 7-168875 | 7/1995 |
| JP | 9-304374 | 11/1997 |
| JP | 9-306003 | 11/1997 |

* cited by examiner

*Primary Examiner*—George Manuel
(74) *Attorney, Agent, or Firm*—Oliff & Berridge, PLC

(57) ABSTRACT

This is an eyeglasses made-to-order system wherein an operator determines eyeglass specifications necessary for ordering eyeglasses, including necessary items relating to each structural member of the eyeglasses, with an interactive system using means including a computer-controlled display screen; wherein any of a plurality of types of basic frame designs prepared in advance is selected from the abovementioned display screen; and the optimum eyeglass specifications reflecting the consumer's preferences can be determined on and ordered from the display screen by arbitrary changes to the structural members of the eyeglasses, including frame type, lens shape, and parts, based on the selected basic frame design. Accordingly, eyeglasses with a design which are more reflective of the eyeglass consumer's preferences can be determined and ordered quickly using only the procedures deemed necessary by the operator.

25 Claims, 36 Drawing Sheets

OPENING

FIG.5
PORTRAIT IMAGING
- TAKE THE CUSTOMER'S PORTRAIT (CAN BE SKIPPED)
* WHEN SKIPPED, [PROCESS] ADVANCES TO FRAME OUTPUT ONLY
(1) FRONTAL PORTRAIT IMAGING (CAN BE SKIPPED)
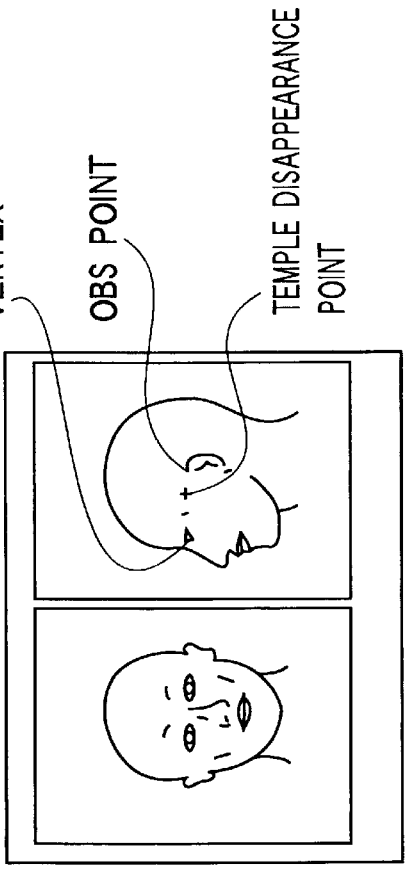
- HIT POSITIONS OF CORNEAL VERTEXES
- INPUT PD VALUE
(2) PROFILE PORTRAIT IMAGING (CAN BE SKIPPED)
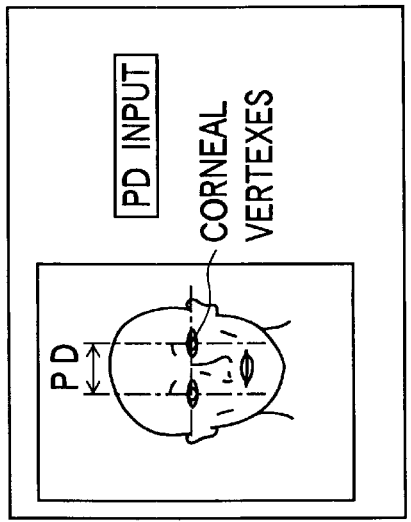
- HIT POSITION OF CORNEAL VERTEX
- HIT TEMPLE DISAPPEARANCE POINT
- HIT OBS POINT

FIG.8

(5) CHANGE PART POSITIONS

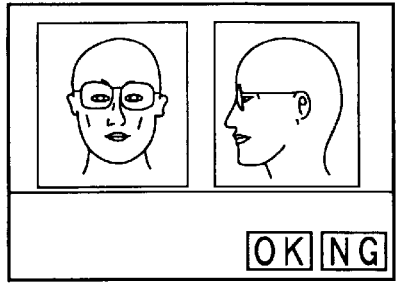

CHANGE THE POSITIONS WHERE PARTS ARE MOUNTED
(1) ENTIRE FRONT
(2) BRIDGE
(3) ENDPIECE

(6) CHANGE SIZE

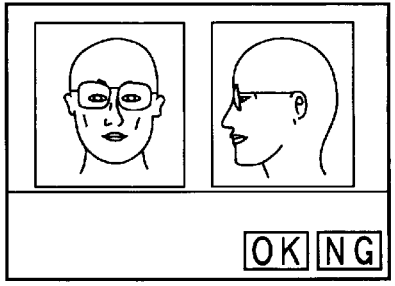

MAKE CHANGES TO SIZE
(1) EYE SIZE
(2) DBL
(3) TEMPLE LENGTH

(7) CHANGE FRAME COLOR

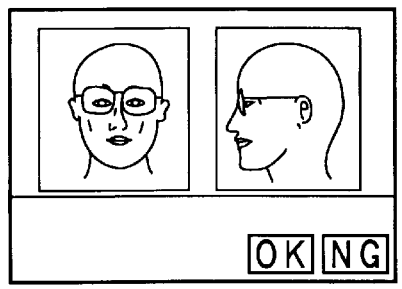

MAKE CHANGES TO FRAME COLOR
(1) OVERALL   (2) BRIDGE
(3) ENDPIECE  (4) TEMPLES
(5) ORNAMENTATION

(8) INPUT LENS PRESCRIPTION

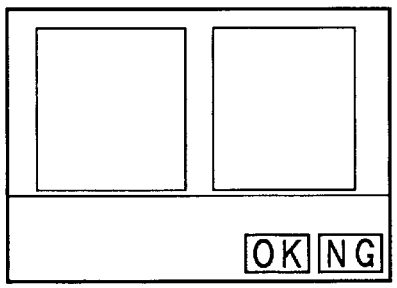

INPUT LENS PRESCRIPTION

(9) INPUT LENS COLOR

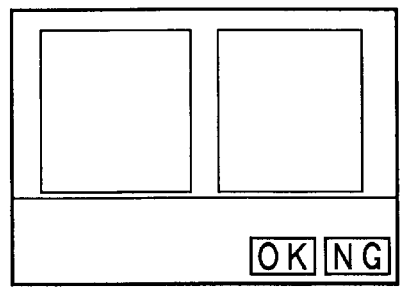

CHANGE LENS COLOR

(10) CHANGE WEARING SCENE

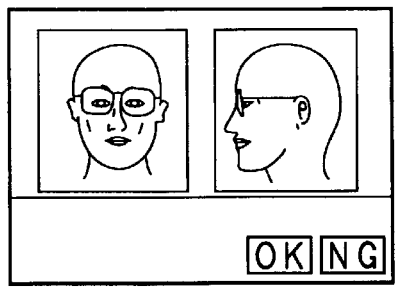

MAKE CHANGES TO WEARING SCENE

FIG.9
COMPARING/EXAMINING
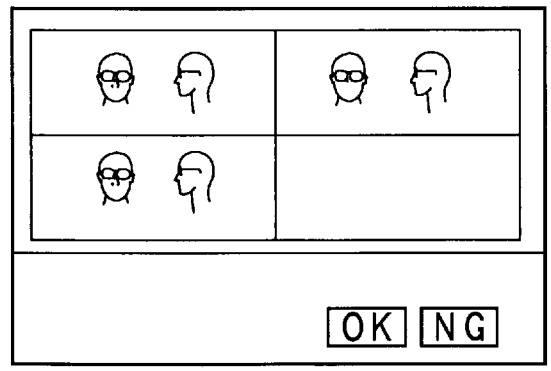
FACIAL MEASUREMENTS
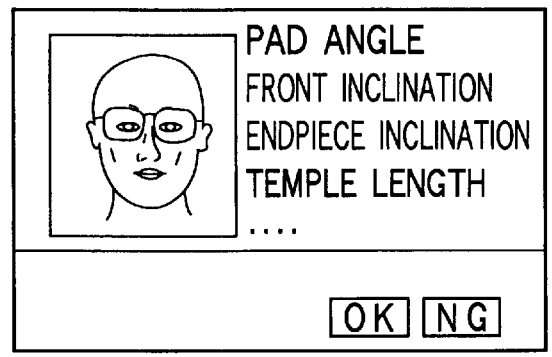
DELIVERY DATA & COST
RESPONSE (ORDER)
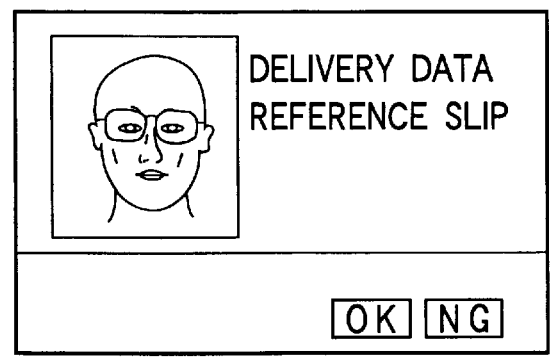

FIG.13
(a)
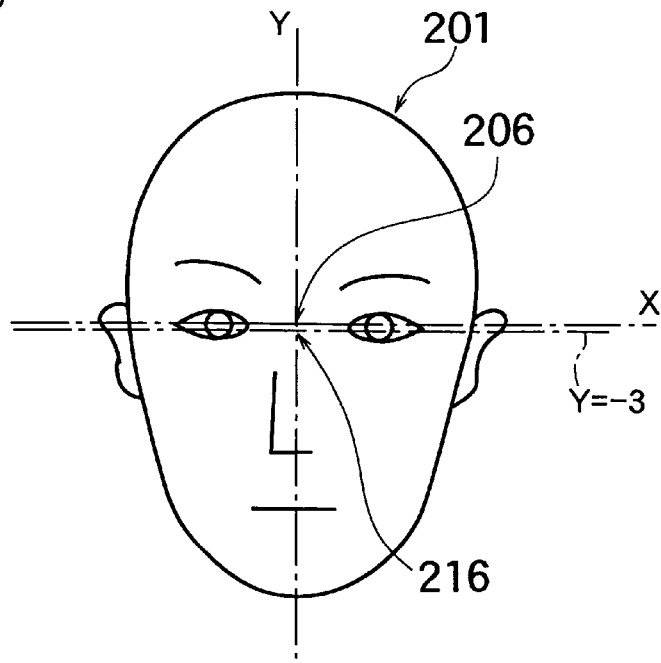
(b)
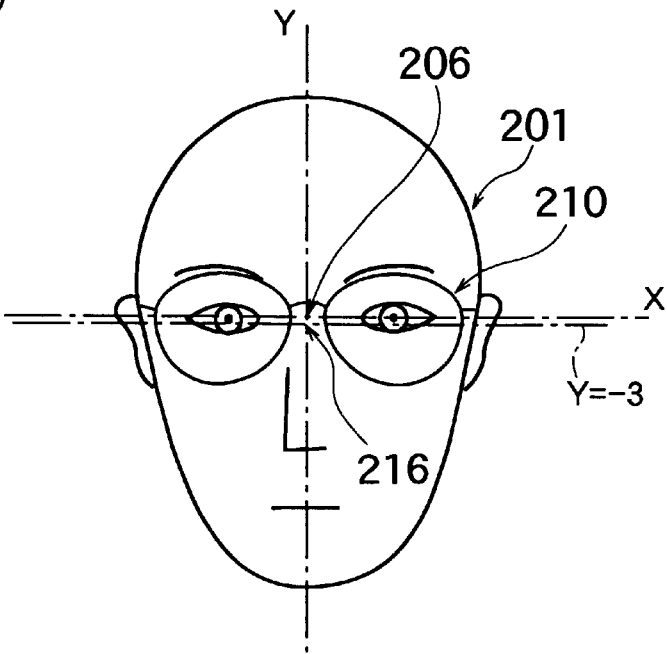

FIG.14
(a)
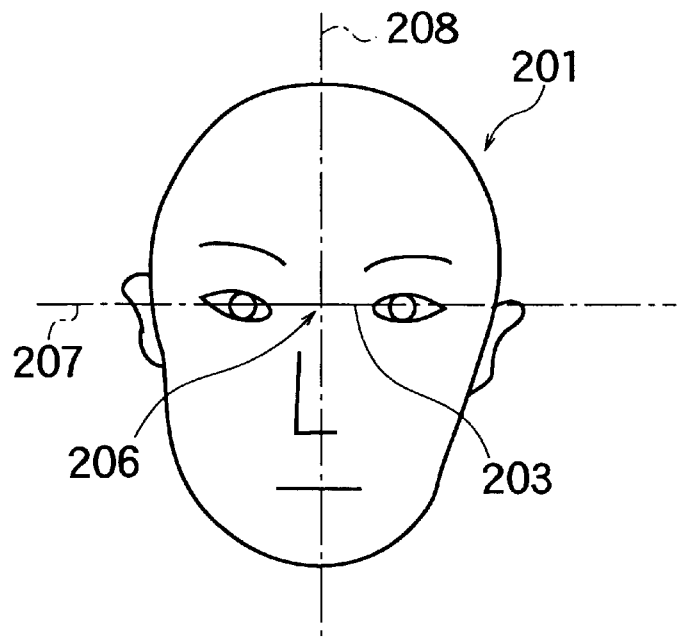
(b)
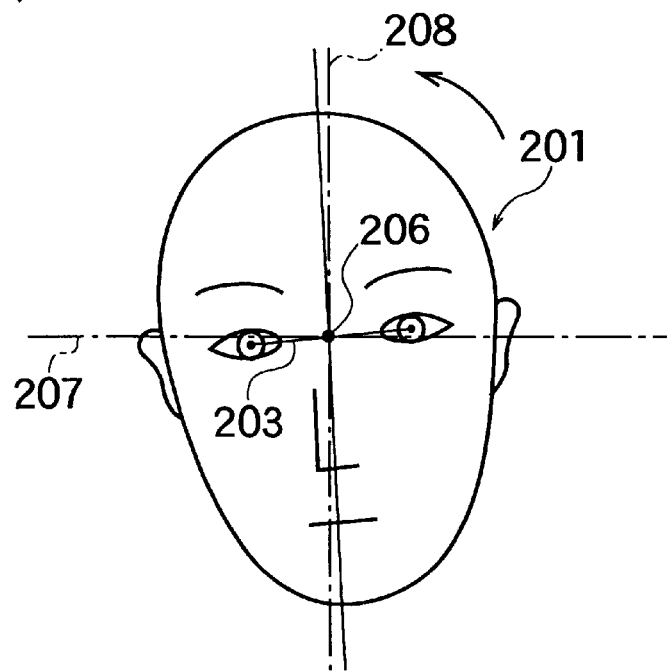

FIG.15
(a)
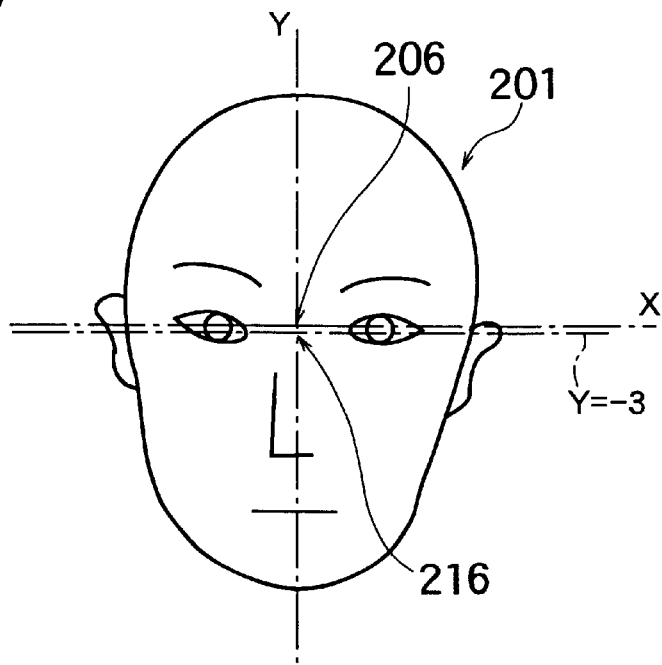
(b)
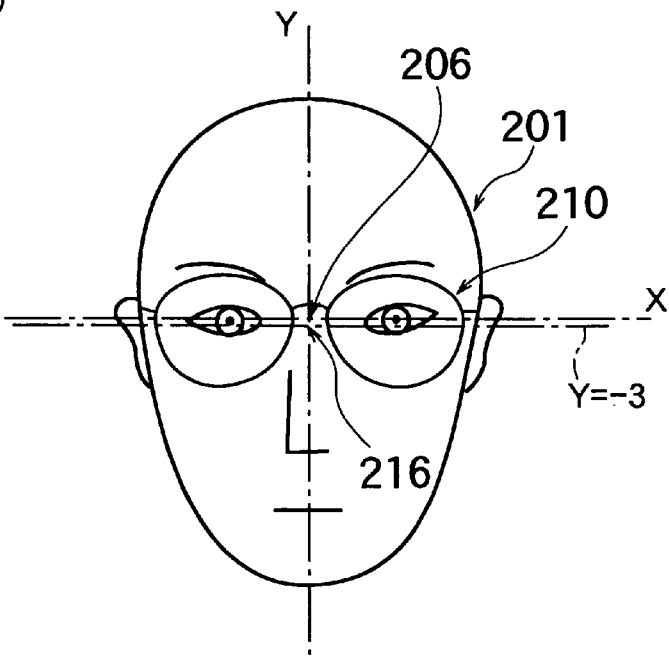

FIG.16
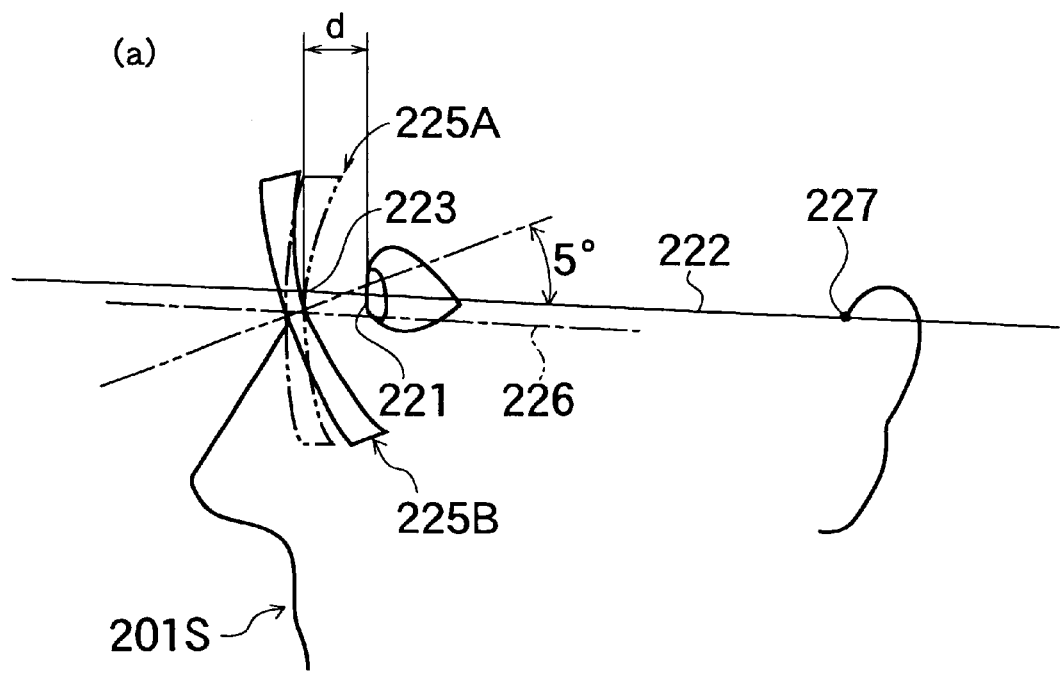
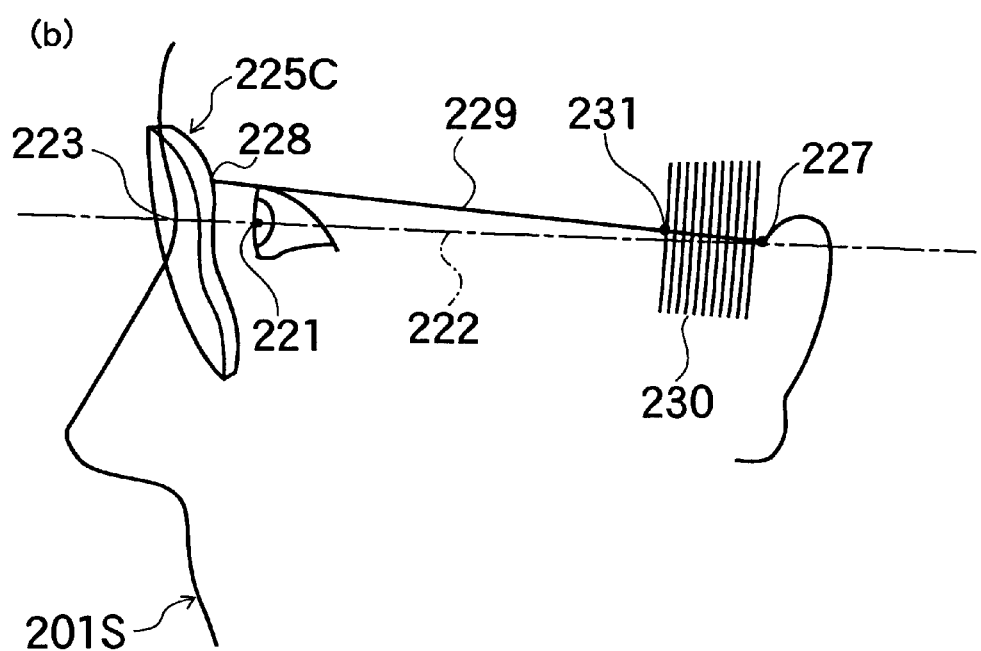

FIG. 17
(a)
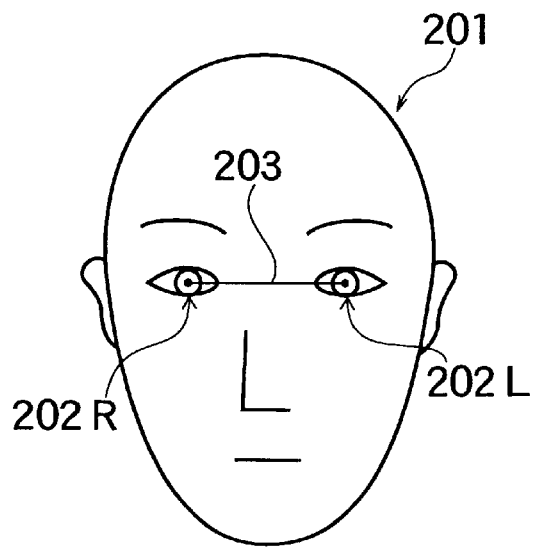
(b)
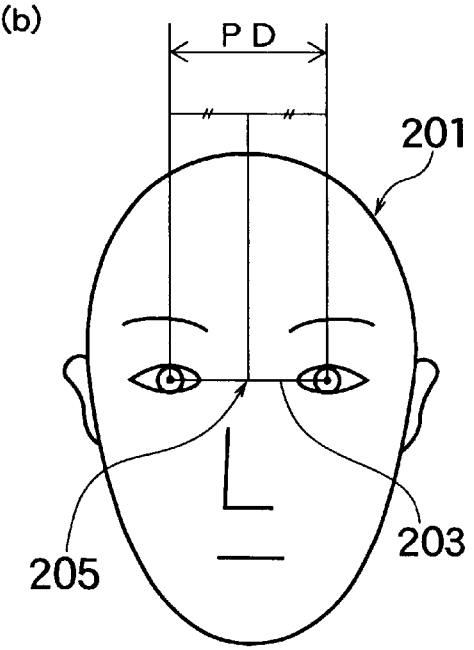

FIG.19
CHANGE FRAME TYPE
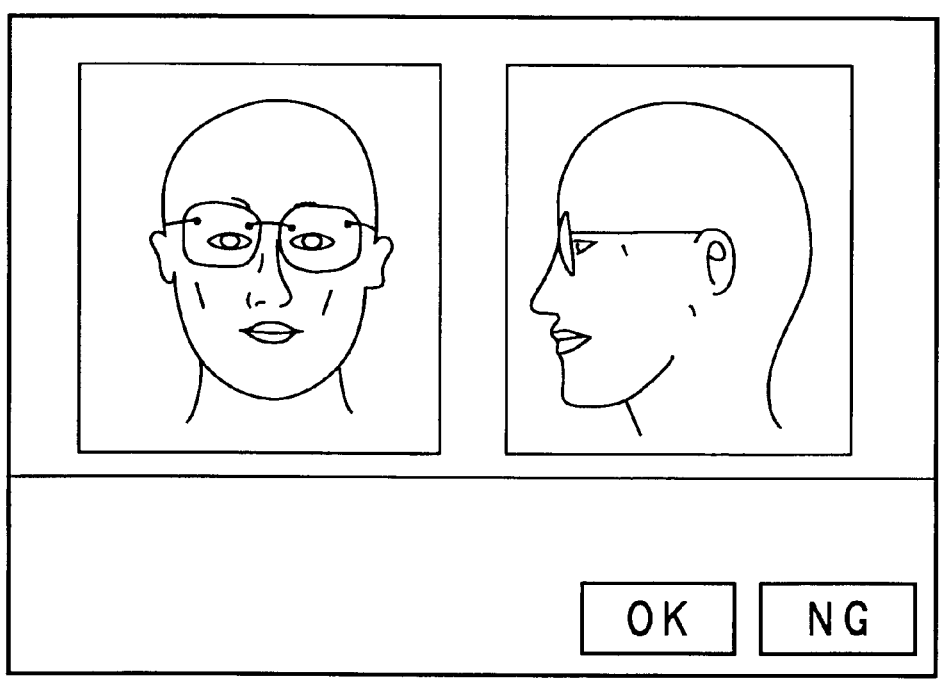
MAKE CHANGES TO FRAME TYPE FROM/TO
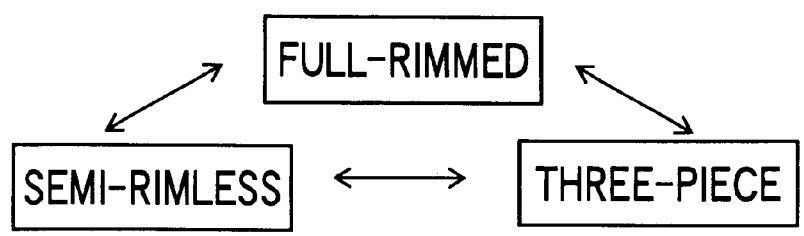

FIG.21
(1)
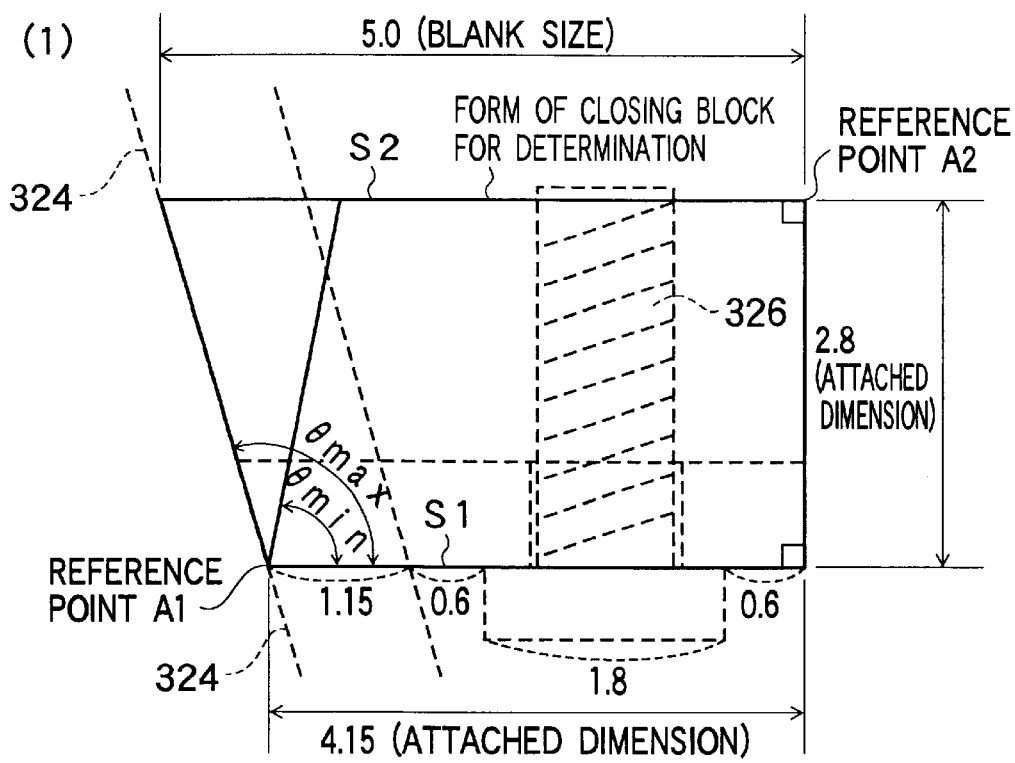
- S1 LENGTH: 4.15mm
  S1 = RIM THICKNESS + RIM ~ SCREW HEAD + SCREW HEAD DIAMETER ~ CLOSING BLOCK END SURFACE = 1.15 + 0.6 + 1.8 + 0.6
- S1, S2 ARE PARALLEL AND 2.8mm APART (MINIMUM DIMENSION FOR ENSURING SOLDER STRENGTH)
- θmax: 107° (CALCULATED FROM BLANK SIZE OF 5mm)
- θmin: 80° (CALCULATED WITH SAFE DISTANCE FROM SCREW PORTION)
(2)
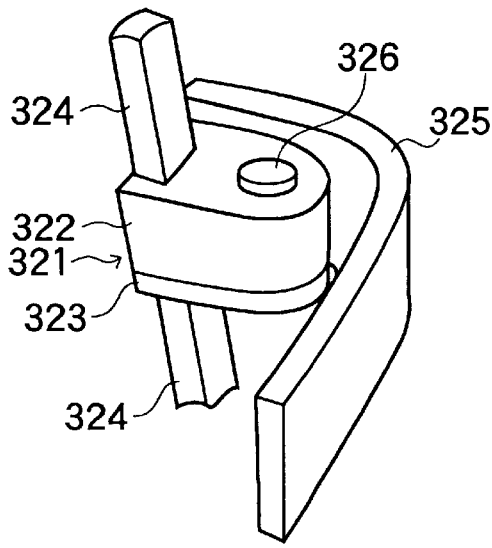

FIG.23

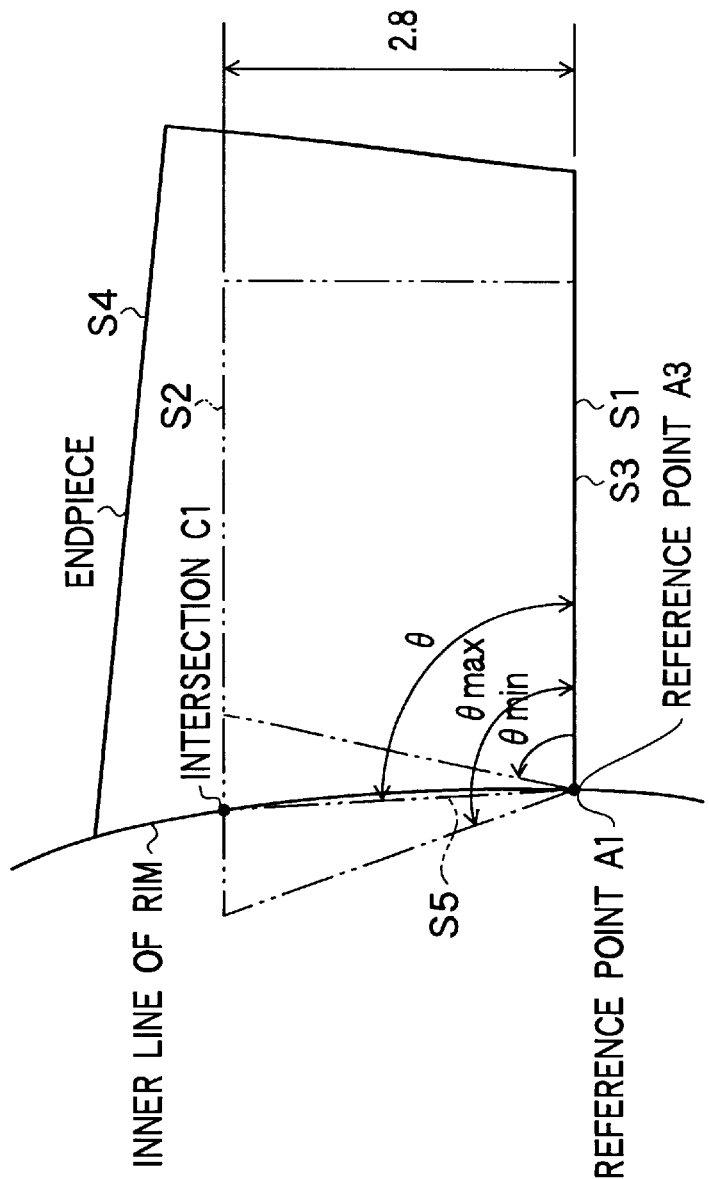

FIND THE CLOSING BLOCK CUTTING ANGLE θ
- MEASURE LINE S2 : PARALLEL WITH S3 OF ENDPIECE, DISTANCE 2.8 MM
- INTERSECTION C1 : INTERSECTION OF MEASURE LINE S2 AND INNER LINE OF RIM
- REFERENCE POINT A3 : INTERSECTION OF S3 OF ENDPIECE AND INNER LINE OF RIM
- MEASURE LINE S5 : LINE CONNECTING REFERENCE POINT A3 AND INTERSECTION C1
- CUTTING ANGLE θ : OBTUSE ANGLE BETWEEN S3 OF ENDPIECE AND MEASURE LINE S5

FIG.27
WITH STOCKED PARTS
 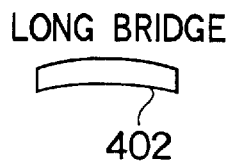 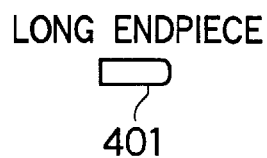
PART POSITIONS AND MACHINED PORTIONS
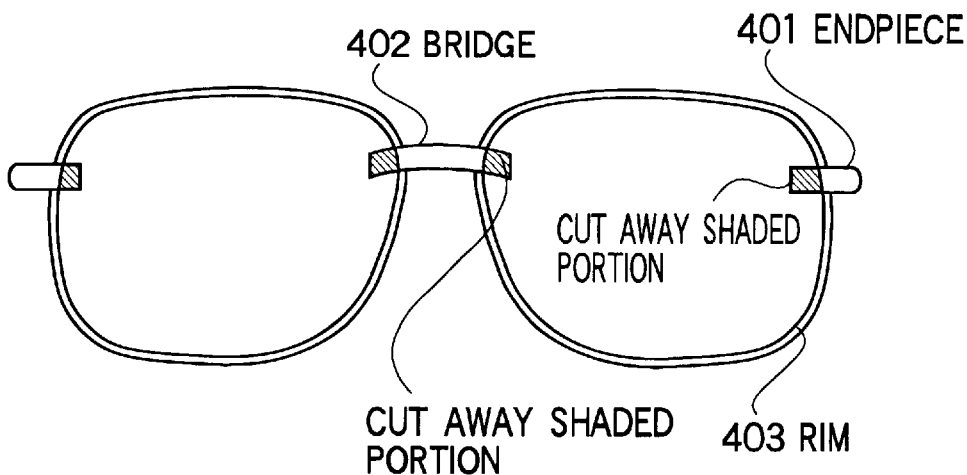
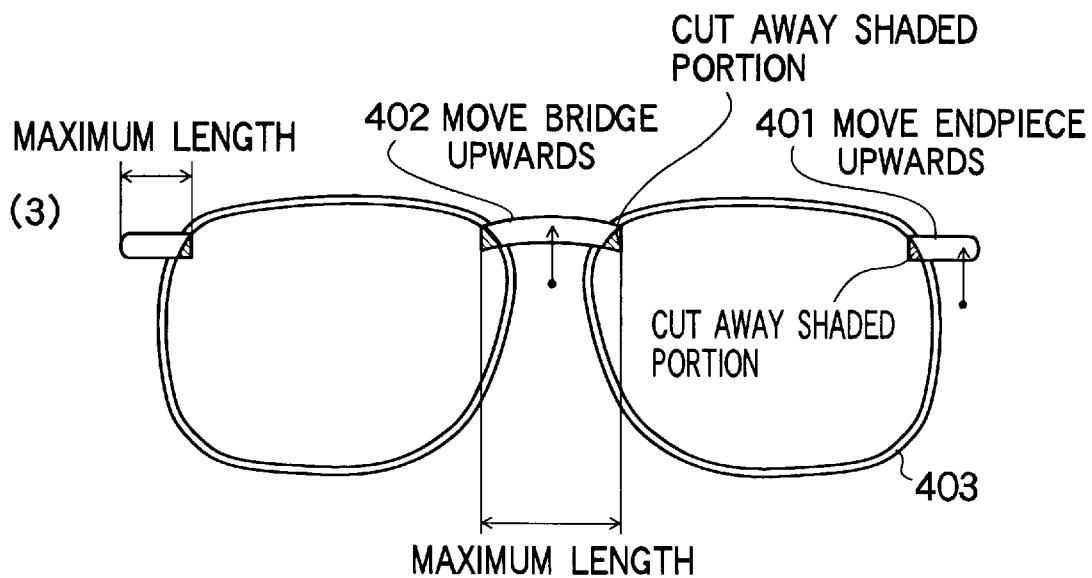

FIG.29
WHEN TWO OR MORE BRIDGES ARE PROVIDED
- THE RANGE OF MOUNTING POSITIONS FOR EACH BRIDGE WHEN TWO OR MORE BRIDGES ARE PROVIDED
EXAMPLE) BRIDGE 411 : POSITION L1 ON LENS SHAPE
BRIDGE 412 : POSITION L2 ON LENS SHAPE
BRIDGE 413 : POSITION L3 ON LENS SHAPE
- DETERMINING WHETHER MOUNTING IS POSSIBLE
MOUNTING IS POSSIBLE IF L1 ≧ B1, L2 ≧ B2, L3 ≧ B3
EXAMPLE WHEN THREE BRIDGES ARE PROVIDED
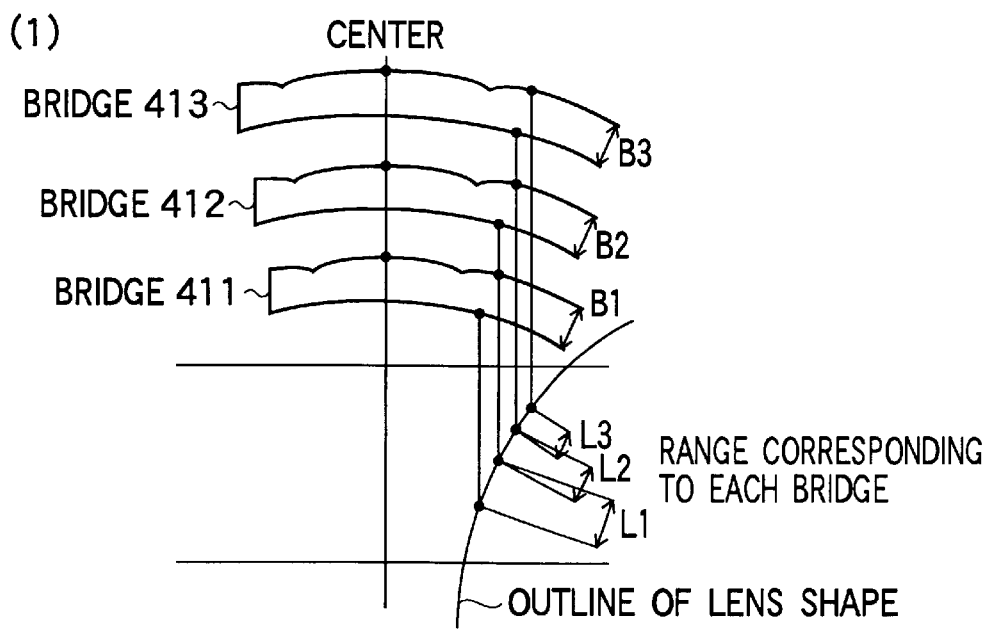
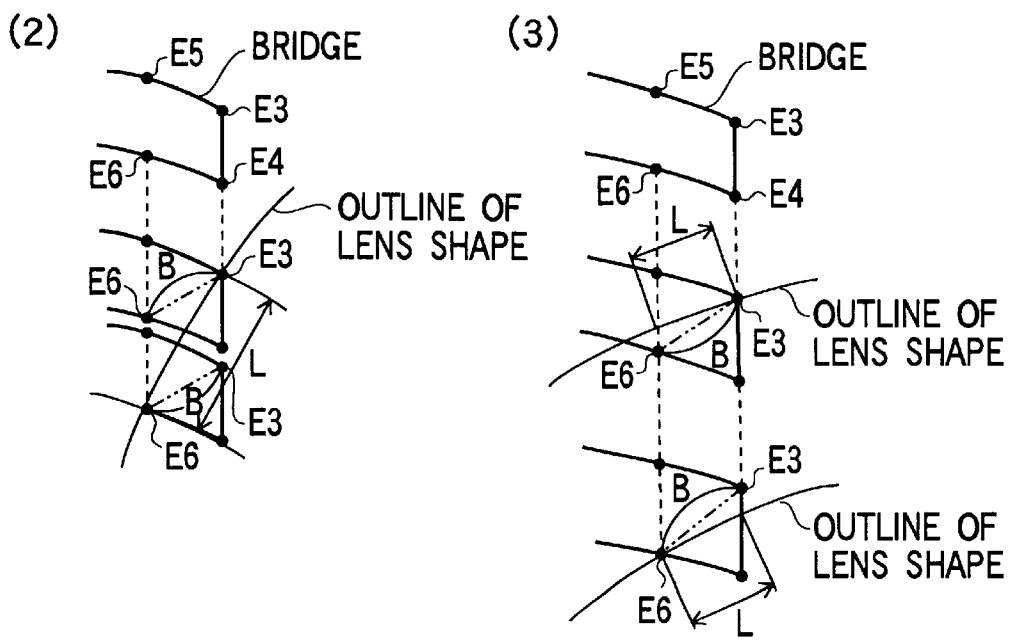

FIG.32

LIMITS TO RANGE OF ENDPIECE EXTENSION (ENDPIECE EXTENSION LENGTH TRIAL)

- REFERENCE POINTS TO LIMIT ENDPIECE EXTENSION
  MINIMUM LENGTH POINT: POINT D2, POINT D3 (BELOW); D3 IS OMITTED WHEN NO
  LIMITS SUCH AS A PATTERN
  DETERMINATION: POINT D2, POINT D3 ON LENS SHAPE OUTLINE OR BEYOND
  LENS SHAPE
  MAXIMUM LENGTH POINT: POINT D4, POINT D5 (BELOW)
  DETERMINATION: POINT D4, POINT D5 ON LENS SHAPE OUTLINE OR BEYOND
  LENS SHAPE

- EXTENSION ADJUSTMENT
  ADJUSTMENT PITCH: 0.5 MM
  INPUT: DISPLAY ALLOWABLE RANGE OF INCREASE OR DECREASE >INPUT NUMERICAL VALUE
  RANGE OF MAXIMUM EXTENSION LENGTH FOR ENDPIECE HEIGTH H1, H2

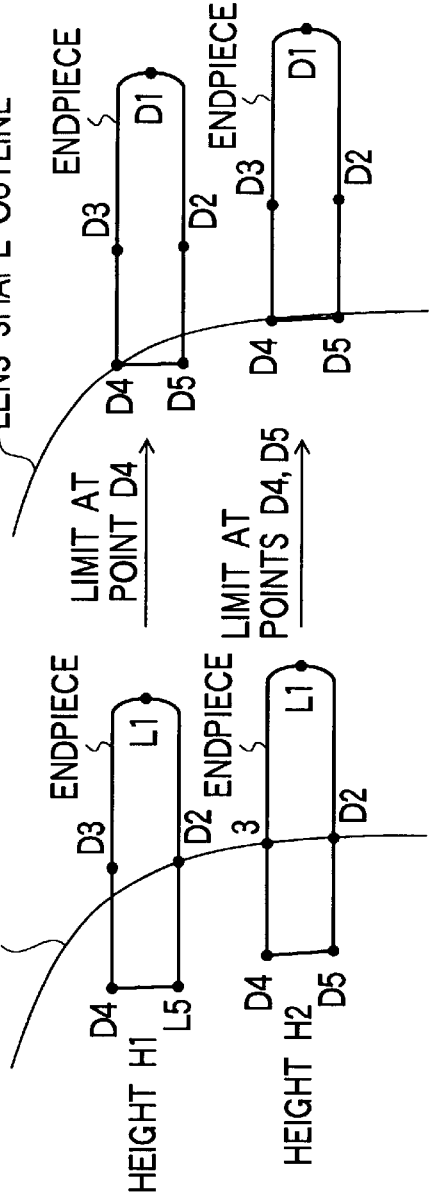

(1) LENS SHAPE OUTLINE (2) LENS SHAPE OUTLINE

FIG.34
EXAMPLE OF BRIDGE WITH LEVELS FOR WHICH IT IS NECESSARY TO ESTABLISH A MINIMUM LENGTH
(1) 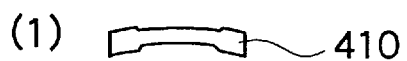
BEFORE MOVEMENT
(2) 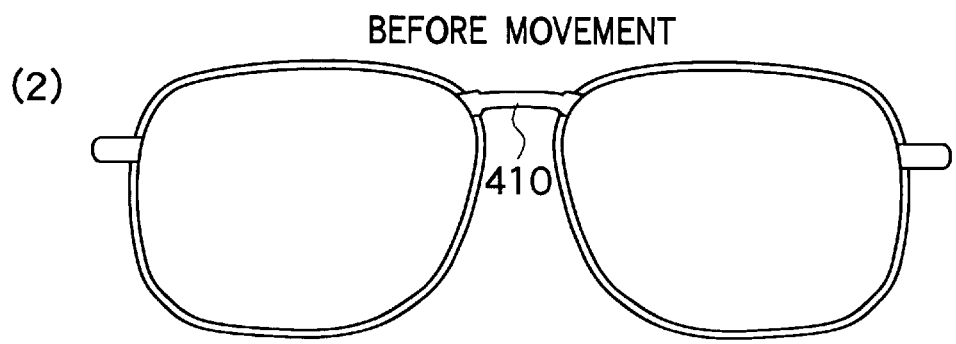
EXAMPLE OF HOW THE IMAGE CHANGES WHEN THE BRIDGE BECOMES TOO NARROW AND THE LEVELS DISAPPEAR
MOVED DOWNWARDS
(3) 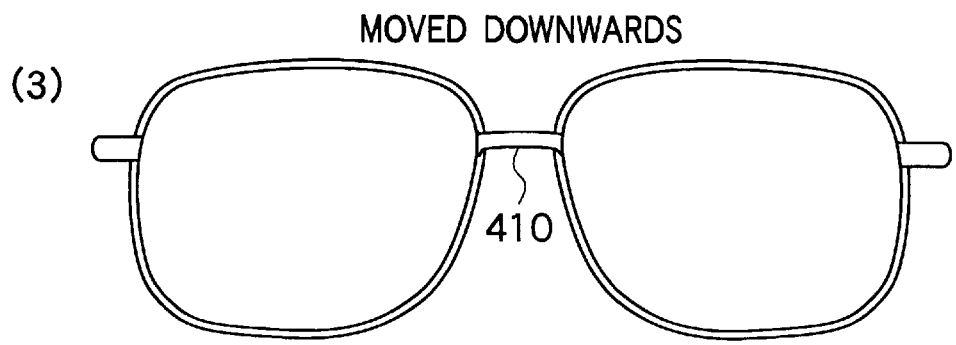

FIG.35
EXAMPLE OF PATTERNED BRIDGE FOR WHICH IT IS NECESSARY TO ESTABLISH A MINIMUM LENGTH
(1) 
(2) BEFORE MOVEMENT
EXAMPLE OF HOW THE IMAGE CHANGES WHEN THE BRIDGE BECOMES TOO NARROW AND THE SECTION WITHOUT THE PATTERN DISAPPEARS
(3) MOVED DOWNWARDS

SYSTEM FOR MAKING SPECTACLES TO ORDER

TECHNICAL FIELD

The present invention relates to an eyeglasses made-to-order system for determining an eyeglass design to reflect the preferences of the eyeglasses consumer using a computer-controlled display screen; and the present invention also relates to methods applied to this system: a method for generating synthetic images to overlay portraits and eyeglass frames, a method for determining the positions of the endpieces and bridge of the eyeglasses, and a method for changing the eyeglass frame type.

BACKGROUND ART

Before now, a method was proposed wherein the portrait (facial image) of an eyeglass wearer (eyeglass consumer) is captured with a computer using computer graphics methods; the characteristics of the facial features are analyzed using predetermined procedures; and the form of the eyeglasses is designed by applying predetermined design rules to the results of the analysis (See Japanese Patent Laid-open No. H5-35827 and Japanese Patent Laid-open No. H7-168875, for example).

Compared to prior general methods wherein the eyeglass designs are determined without consideration of the differences in eyeglass wearers' facial features, the abovementioned conventional method has a greater possibility of attaining an eyeglass design which better suits the facial features of the eyeglass wearer because the characteristics of the facial features are analyzed by computer and a design is generated to fit the facial features.

However, in the abovementioned conventional method, a computer mainly performs the procedures for analyzing the characteristics of the facial features and selecting the design to suit the characteristics thereof. In other words, the analysis of the characteristics of the facial features and the determination of the design to fit those analyzed characteristics is in this method essentially made by the people who created the system software, such as the designers and programmers. Consequently, the designs attained inevitably depend greatly on the sensibility and thinking of the people who created the system software.

However, design preferences differ greatly from person to person; it is hard to imagine that the sensibility of a specific designer would be accepted by all people. Accordingly, the abovementioned conventional method attains results which are satisfactory in the case where the sensibility and so forth of the designer act in a positive direction, but at the same time, there is a considerable possibility that the reverse case will occur. Moreover, the essential processes in the abovementioned method are determined in advance by the computer software, starting with a process to capture the facial image, and there is little room for operator choice. In determining the design, all of the predetermined processes are carried out automatically. As a result, there is a possibility that time will be used unnecessarily in determining the design in some cases.

In view of the foregoing situation, it is an object of the present invention to provide an eyeglasses made-to-order system, wherein an eyeglass design that better reflects the eyeglass wearer's preferences can be determined and ordered quickly with the operator performing only those procedures thought necessary.

Also, apparatuses to simulate the wearing of eyeglasses, using an imaging function to capture the frontal portrait of a person's head on a computer-controlled display screen and displaying the portrait wearing the eyeglasses by laying the image of the eyeglass frames over the portrait on screen, were known to be used in determining eyeglass designs and so forth before now (Japanese Patent Laid-open No. S63-76581).

In this type of conventional simulation apparatus, different methods for overlaying the frame image on the portrait were tried. These methods include the method for finding the optimal position while moving the frame image and the method, wherein (a) the coordinates of both corneal vertexes 202L and 202R are found on the portrait 201 and a line 203 connecting the corneal vertexes 202L, 202R is found; and (b) the bisection point of that line 203 is determined to be a reference point 205 and the frame image is laid over on the portrait with the reference point of the frame image matched to that reference point 205, as shown in FIG. 17.

However, even if the optimal position is determined visually on screen and the frame image is laid over the portrait, this is not a natural simulation because it may vary from the actual wearing state in the case where a precise frontal image was not attained. Also, because portraits are not bilaterally symmetric, it is not possible to simulate a natural state of wearing eyeglasses if the frame image is overlaid with the center point of the line between corneal vertexes on the portrait as the reference point for the portrait. Furthermore, the information provided with a simulation using only a frontal image is not sufficient for selecting eyeglasses.

In view of the foregoing situations, it is an object of the present invention to make possible a natural simulation of wearing eyeglasses with consideration of the asymmetry of facial features, and to make possible the simulation of wearing eyeglasses as seen from a profile view of the face and to provide sufficient and precise information for selecting eyeglasses.

Also, before now, the design of the individual parts and their positions, as well as the lens shape, were thought to be important as principal elements for determining the design of the eyeglasses. Attempts are made to apply a variety of ornamentation to the parts and to make the parts in unique shapes. Consequently, various designs were naturally considered for the endpieces and bridge and operations to apply the ornamentation and so forth were also performed.

However, although the positions of the endpieces and bridge are a regular design consideration, the designer usually determines these from a functional profile, based mainly on an average model that considers the mean facial width and mean distance between pupils, that the bridge does not strike the nose, and whether there is an optimal position for mounting the temples.

However, when the eyeglass wearer actually wears these eyeglass frames, it is often thought that different positions for the endpieces and bridge would better match the face shape of the eyeglass wearer. Depending on the eyeglass wearer, it may be desirable to make the nose appear taller by establishing the bridge at a higher position than usual, for example. Before now, changing the positions of the endpieces and bridge according to customer preferences was not a consideration and it was not possible to respond to such preferences.

In view of the foregoing situation, it is an object of the present invention to provide a method for determining the positions of the endpieces and bridge of the eyeglasses, so that the positions of the endpieces and bridge of the eyeglasses can be determined according to the eyeglass wearer's preferences, and so that the design of the eyeglasses can better reflect the eyeglass wearer's preferences.

Eyeglass frames can be generally classified into three categories, based mainly on differences in the structures which hold the lenses: the full-rimmed type, the semi-rimless type, and the three-piece type (also known as the Arimless type).

The full-rimmed type has the entire perimeter of the lenses enclosed by the rims. The semi-rimless type has, as the basic structure, all or part of the upper portion of the lens perimeters enclosed with rim and the lower portion supported with nylon thread. The three-piece type does not use rim and has the bridge and temples mounted directly on the lenses.

However, it is not realistic to prepare and stock or carry all of the abovementioned three types of frames for each of the various design images. Generally one type of frame is prepared for one design image.

However, it may be that while the design images of frames stocked by the store match the customer's desire, the frame types thereof do not match the customer's desire. Consequently, this situation requires eyeglasses with the design of a frame in stock, but only with a different frame type. However, it has been remarkably difficult in practice to respond to such customer demands before now.

In the case of changing frame type, the change could be relatively simple if it were possible to use the frame data before the change, without any modifications, as the frame data after the change (as design or manufacturing data). However, because of structural differences among the different frame types, it is often the case that manufacturing would actually be impossible simply using the unmodified, pre-change frame data as the post-change frame data (as design or manufacturing data). Consequently, such a situation requires starting from the same point as a new frame design and is not practical.

In view of the foregoing situation, it is an object of the present invention to provide a method for changing the eyeglass frame type, that makes it relatively simple to change the frame type without changing the design image, by performing data revision operations and data addition operations based on uniform standards, for data relating to the eyeglass frames before the change.

DISCLOSURE OF THE INVENTION

The present invention employs the following constitution to achieve the abovementioned objects.

The eyeglasses made-to-order system relating to the present invention comprises:

(1) an eyeglasses made-to-order system wherein an operator uses an interactive system with means including a computer-controlled display screen to determine eyeglass specifications necessary for ordering eyeglasses, including necessary items relating to each structural member of the eyeglasses;

wherein any of a plurality of types of basic frame designs prepared in advance is selected from the abovementioned display screen; and the optimum eyeglass specifications, reflecting the consumer's preferences, can be determined on and ordered from the display screen, by any changes to the structural members of the eyeglasses, including frame type, lens shape, and parts, based on the selected basic frame design.

The operator of the abovementioned made-to-order system may be the eyeglass consumer, an employee of the store, or someone else; in effect, anyone who can operate the made-to order system and determine the eyeglass design in a form which sufficiently reflects the will and preferences of the eyeglass consumer.

The basic frame designs allow the eyeglass consumer to decide upon eyeglasses with a design he/she desires. As the starting point for determining a design, frame designs are collected as base models for selecting eyeglasses with a design similar to that imagined by the eyeglass consumer (Moreover, when frames with a basic design are desired, the frames may be ordered without any changes to the desired basic frame design.). Consequently, frames of various designs with different design tendencies may be prepared to make it possible to respond to the preferences of a broad range of customers (eyeglass consumers). For example, a plurality of designs matched to the frame types are prepared as basic frame designs for each of the frame types (the three types: rimless, semi-rimless, full-rimmed). Moreover, different designs for a single frame type may also be brought together as basic frame designs.

A method for designing eyeglasses is to select the lens shape, bridge, endpieces, temples, and so forth for a specific design and assemble these selected eyeglass parts; but this method is difficult for the usual customer who is not a designer. In the eyeglasses made-to-order system relating to the present invention, a plurality of types of basic frame designs is prepared in advance and frames with a design similar to that imagined by the eyeglass consumer are selected from among these basic frame designs as the starting point for determining the design. Based on the frames with the selected design, original eyeglasses can be designed with great freedom by making the various preferred changes, including changes to the frame type, to the structural members of the eyeglasses. For this reason, even a regular customer can easily create eyeglasses with the desired design; also, an eyeglass design which better reflects customer preferences can be determined quickly by performing only those procedures thought necessary by the operator.

The abovementioned changes to the structural members of the eyeglasses include revision, addition and deletion of the structural members. Specific examples of changes include changing the frame type, replacing the lens shape, revising the lens shape, changing parts, adding and deleting parts, changing part positions, changing sizes such as eye size and the distance between lenses, changing the colors of the frame parts, changing lens color, changing the lens prescription, and so forth. The design is considered in the changes to the abovementioned structural elements; moreover, it is preferable that limiting conditions of the structure, function, and manufacturing requirements be determined and the changes be confirmed to be within a range satisfying these conditions. Thereupon, the specifications for eyeglasses with the desired design are determined and the eyeglass order is placed. After that, cases such as the eyeglasses being impossible to manufacture due to structural reasons, or the like, will not arise and the process can immediately advance to the manufacture of the eyeglasses.

Also, the eyeglasses made-to-order system relating to the present invention comprises:

(2) an eyeglasses made-to-order system wherein an operator determines eyeglass specifications necessary for ordering eyeglasses, including necessary items relating to each structural member of the eyeglasses, with an interactive system using means including a computer-controlled display screen, and comprising:

a basic design selecting function for selecting from the display screen any of a plurality of basic frame designs prepared in advance;

a portrait capturing function for taking the portrait of the eyeglasses consumer;

a synthetic image generating function for overlaying the image of the selected frames on the portrait taken by the abovementioned portrait capturing function and displaying a portrait wearing the eyeglasses on the abovementioned display screen;

one or more changing functions for changing, revising, or inputting necessary items on the display screen, relating to each of the plurality of structural members of the eyeglasses, including the frame type, lens shape, and parts, based on the basic frame design selected using the abovementioned basic design selecting function;

a storing function for storing data including one or more images of the eyeglasses attained on the display screen; and a comparing/examining function for comparing or examining the one or more eyeglass images, including the eyeglass images stored in the abovementioned storing means, displayed on the display screen, deciding upon one of those, or returning to the step for performing the abovementioned changing function;

wherein the operator performs only those procedures or function changes thought necessary after selecting the basic frame design, makes the best use of the eyeglass consumer's free will, and quickly and accurately performs the ordering operation because after selecting the basic frame design using the abovementioned basic design selecting function, the operator can arbitrarily select and perform any one or more of the functions: the abovementioned portrait capturing function, the abovementioned synthetic image generating function, the abovementioned one or more changing functions, or the abovementioned comparing/examining function.

In this way, it is possible to determine a design, based on the selected basic frame design, by selecting any of a plurality of types of basic frame designs prepared in advance on screen, and then freely choosing only those functions thought necessary by the operator from among the portrait capturing function, synthetic image generating function, one or more changing functions, and the comparing/examining function. As a result, the principal processes for determining an eyeglass design can be performed according to the procedures freely selected by the operator with the interactive system, instead of according to procedures determined in advance by the computer software. Accordingly, it becomes possible to determine a design which more directly reflects the sensibilities and preferences of the eyeglass consumer; at the same time, the operator can perform only those functions thought necessary, making possible rapid processing.

According to the second constitution above, (3) the eyeglasses made-to-order system is a system wherein the abovementioned synthetic image generating function comprises the function of laying the profile image of the selected frames over the profile image of the eyeglass consumer's face captured with the abovementioned portrait capturing function, as well as the function of laying the frontal image of the selected frames over the frontal image of the eyeglass consumer's face captured with the abovementioned portrait capturing function.

The frontal portrait wearing the eyeglass frames shows only the influence of the front portion of the eyeglass frames on the eyeglass wearer. Actually, however, the profile portrait wearing the eyeglass frames is important for confirming the design of the eyeglass frames. In other words, the design of the eyeglass frame is greatly changed by ornamentation, jewels, and so forth applied on the endpieces and temples; and the design greatly influences the profile image of the eyeglass wearer. Furthermore, changing the position of the temples (height) and changing the proportional division of the profile with the temples can have effects such as making a short face look longer or a long face look shorter. This also allows the wearing of the prescription lenses and frames to be checked from many angles. Consequently, seeing the image of the profile portrait wearing the eyeglass frames makes it possible to select and decide upon the overall details of the design, in determining the design of the eyeglass frames.

According to the second constitution above, (4) the eyeglasses made-to-order system is a system wherein the abovementioned one or more changing functions include one or more of the following: frame type changing function, lens shape replacing function, lens shape revising function, part changing function, part position changing function, size changing function for changing sizes such as eye size and the distance between lenses, color changing function for changing the colors of the parts constituting the frames, lens color changing function, usage scene changing function for changing the background for lens usage, and lens prescription inputting function.

According to the second constitution above, (5) the eyeglasses made-to-order system comprises the function of taking facial measurements of the abovementioned eyeglass consumer, adding those measured values, and revising the eyeglass specifications.

The portrait of the eyeglass consumer wearing the eyeglasses displayed on the display screen is an image of a two-dimensional simulation, not a three-dimensional simulation. Moreover, only approximate numerical values can be attained for the dimensions and angles of various portions of the face such as the facial width and distance between the pupils. For this reason, precise numerical data, relating to the three-dimensional dimensions and angles of each portion of the face to wear the eyeglasses, are necessary in order to produce eyeglass frames which fit the face well. The present invention includes a function for adding facial measurements from the eyeglass consumer and revising the eyeglass specifications. Appropriate revisions are made to the eyeglass specifications determined with a two-dimensional simulation on the display screen based on facial measurement data; this results in optimal eyeglass specifications which can be used as manufacturing data to manufacture eyeglasses which fit the face and satisfy the optical requirements of the eyeglasses. The facial measurements may be made using various measuring instruments, but a specialized face measuring instrument (Japanese Utility Model Laid-open No. S63-110355, Japanese Patent Application No. H9-306003), called a face measure, may be used to make the measurement quickly and precisely. This face measuring instrument comprises the structural members of eyeglasses, such as lenses, pads, endpieces, temples, and so forth and is worn on the face in the same way as eyeglasses. With this face measuring instrument worn on the face, the dimensions of and angles between the structural members are adjusted to the form of the face. The three-dimensional facial form is measured by reading the dimensions of the structural members and the assembled angles between the structural members from the gradations and so forth on the adjusted face measuring instrument.

According to the second constitution above, (6) the eyeglasses made-to-order system comprises an order check access function for accessing the order check database comprising data including data necessary for manufacturing the eyeglasses after said eyeglass specifications are determined, and attaining information necessary when ordering eyeglasses, including whether it is possible to manufacturing eyeglasses to those specifications, price, or delivery date.

According to the second constitution above, (7) the eyeglasses made-to-order system comprises an order access function for accessing an order acceptance database, comprising data including order acceptance processing, processing of data necessary for manufacturing the ordered eyeglasses, and processing of instructions necessary for manufacturing the eyeglasses, and completing the order after the abovementioned order check access function is performed and the order determined.

A method for generating synthetic images for an apparatus to simulate eyeglass wearing relating to the present invention comprises:

(8) a method for generating synthetic images for an apparatus to simulate eyeglass wearing by capturing the frontal portrait of a person's face on a computer-controlled display screen using an imaging function, laying the image of eyeglass frames over the portrait on the screen, and displaying a portrait wearing eyeglasses;

wherein reference points for the portrait captured on the abovementioned screen are determined using actual measurements relative to the placement of the abovementioned person's eyes and the frame image is laid over the portrait so that the reference points of the eyeglass frame image match the portrait's reference points.

Usually the face of a person seen from the front is not bilaterally symmetric; it is therefore often the case that the frames cannot be placed on the face in a natural position, as when eyeglasses are actually worn on the face, simply by laying the center of the frame image over the center of the line between the corneal vertexes on the display screen. An apparently natural overlay of the eyeglass frame image, with consideration of the bilateral asymmetry of the frontal portrait, can be attained by determining the reference points on the portrait captured on the display screen with the actual measurements relative to the positions of the person's eyes, and matching the reference points of the eyeglass frame image to the reference points of the portrait.

According to the eighth constitution above, (9) the method for generating synthetic images for an apparatus to simulate eyeglass wearing is a method wherein measured values of the distances from the bridge of the abovementioned person's nose to each of the corneal vertexes are used as the actual measurements relative to the placement of the eyes; and the point at which a line connecting the corneal vertexes on the portrait captured on the screen is divided according to the ratio of the abovementioned measured distances to the corneal vertexes is a reference point for the abovementioned portrait. With this embodiment, the reference points can be correctly determined because of using the value of the distance between corneal vertexes, measured using a pupilometer or the like at the prescription making stage, to determine the portrait's reference points.

According to the ninth constitution above, (10) the method for generating synthetic images for an apparatus to simulate eyeglass wearing is a method wherein the frame image is enlarged or reduced relative to the portrait or the portrait is enlarged or reduced relative to the frame image, according to the ratio of the measured values of the distances to the corneal vertexes of the abovementioned person to the distances to the corneal vertexes of the portrait captured on the screen. With this embodiment, the magnification of the portrait can be conformed to the magnification of the frame image.

According to the ninth constitution above, (11) the method for generating synthetic images for an apparatus to simulate eyeglass wearing is a method wherein the portrait is automatically rotated and corrected so that the line segment connecting the corneal vertexes of both eyes of the portrait captured on screen becomes horizontal on the screen. With this embodiment, the portrait can be automatically made vertical even if the portrait was tilted at the moment when captured on screen.

According to the eleventh constitution above, (12) the method for generating synthetic images for an apparatus to simulate eyeglass wearing is a method wherein the portrait is revised after the abovementioned automatic rotation and revision using manual rotation so that the entire portrait is balanced. With this embodiment, the attitude of the portrait can be revised with consideration of the overall balance of the portrait and a natural state of wearing eyeglasses can be simulated.

Also, the method for generating synthetic images for an apparatus to simulate eyeglass wearing relating to the present invention comprises:

(13) a method for generating synthetic images for an apparatus to simulate eyeglass wearing comprising the steps of capturing the profile portrait of a person's face on a computer-controlled display screen using an imaging function, determining reference points from this facial profile image, and laying the image of the eyeglass frames over the profile image based on the reference points.

An image simulating the wearing of the eyeglasses as seen from the side can thereby be attained; this can provide sufficient and accurate information for selecting eyeglasses and can broaden the range of comparing and examining, even in the case of manufacturing custom-made frames. For example, it is possible to confirm effects such as the influence on the eyeglass wearer's profile from adding ornamentation or jewels to the endpieces and temples, or making the face appear longer or shorter by changing temple height and the proportional division of the profile by the temples. It is also possible to confirm the prescription lenses and frames, as worn, from a greater number of directions.

The reference points for the abovementioned profile image are points to be the reference for appropriately positioning the frames on the profile portrait; the reference points are points such as the following: the corneal vertexes, bending point (point of contact with ear), the eye points at a prescribed distance (12 mm, for example) to the front of the corneal vertexes on a line between the corneal vertexes and the bending point, the temple disappearance point which is the boundary point where the temple is hidden by hair beside the face, such as sideburns. Based on these reference points, for example, the temple is placed on a line between the endpiece position and bending point; when there is a temple disappearance point, the end of the temple beyond the temple disappearance point is deleted from the image.

According to the thirteenth constitution above, (14) the method for generating synthetic images for an apparatus to simulate eyeglass wearing comprises the steps of capturing the profile portrait of the abovementioned person's face on a screen, finding the eye points at a position a prescribed distance to the front of the corneal vertexes in the portrait image, and laying the lens profile image using the eye points as reference points, as well as the frame profile image over the lens profile image.

A method for determining the positions of the endpiece and bridge of the eyeglasses relating to the present invention comprises:

(15) a method for determining the positions of the endpieces and bridge of the eyeglasses wherein the facial image data of the eyeglass consumer and the form data for the selected eyeglass frames are captured and displayed on screen using a computer graphics method, and the positions of the endpieces and bridge on the abovementioned selected eyeglass frames can be moved on screen, allowing the selection and determination of the positions for the abovementioned endpieces and bridge preferred by the eyeglass consumer. It is possible to change the image of the eyeglass wearer's face and correct defects of the face by changing the positions of the endpieces and bridge. Because the positions of the endpieces and bridge can be moved on screen to suit the face of the eyeglass wearer, this is effective for selecting an eyeglass design which better reflects the eyeglass wearer's preferences.

According to the fifteenth constitution above, (16) the method for determining the positions of the endpieces and bridge of the eyeglasses is a method wherein the range of movement for the abovementioned endpieces and bridge is determined from limits of the design or of the function and structure. The method for determining the allowable range of movement is to establish reference points and reference lines to establish the maximum and minimum lengths of the endpieces and bridge required by the limitations of the design or of the function and structure, for example, and to determine whether these reference points and reference lines lie within or without the lens shape.

According to the fifteenth constitution above, (17) the method for determining the positions of the endpieces and bridge of the eyeglasses is a method wherein the movements of the abovementioned endpieces and bridge to be moved are linked together.

According to the fifteenth constitution above, (18) the method for determining the positions of the endpieces and bridge of the eyeglasses is a method wherein the direction in which the abovementioned endpieces are moved is limited to a horizontal direction and so that the amounts of movement become the same but in mutually opposite directions for the right eye and the left eye. The bilateral symmetry of the eyeglasses is preserved with this type of movement.

According to the fifteenth constitution above, (19) the method for determining the positions of the endpieces and bridge of the eyeglasses is a method wherein the direction in which the abovementioned bridge is moved is limited to a vertical direction. The bilateral symmetry of the eyeglasses is preserved with this type of movement.

A method for changing the type of eyeglass frames relating to the present invention comprises:

(20) a method for changing the type of eyeglass frames for changing the frame type without changing the design image, wherein data relating to the frames, including the frame form for second eyeglass frames related to a second frame type having a design image in common with the design image of first eyeglasses, are attained by the steps of:

performing data revision operations, to add the minimum necessary revisions required to satisfy the limiting conditions including limitations of the structure or design of a second frame type, while performing data addition operations, to add data relating to parts which are present in the second frame type but not in said first frame type, to data relating to the frames, including the frame shape for first eyeglass frames affiliated with a first type of frames having a specific design.

With this method for changing the eyeglass frame type, it is possible and relatively simple to change the frame type without changing the design image, by performing standard data revision operations and data addition operations for data relating to the eyeglass frames before the change. Accordingly, for example, if this method is performed using the simulation apparatus located in the store, it becomes possible to actually order other types of frames with the design images of frames stocked in the eyeglasses store and to respond to a greater diversity of needs.

According to the twentieth constitution above, (21) the method for changing the type of eyeglass frames is a method wherein the abovementioned data revision operations for changing from the abovementioned first type of rimless eyeglass frames to the abovementioned second type of full-rimmed eyeglass frames include:

Concave (reverse R) check, maximum radius (R) check, and determining closing block position; closing block position radius check and the radius revision for the closing block position performed when that R value is below a certain value; and minimum radius check and minimum radius revision performed when that minimum R value is below a certain value.

According to the twentieth constitution above, (22) the method for changing the type of eyeglass frames is a method wherein the abovementioned data revision operations for changing from the abovementioned first type of rimless eyeglass frames to the abovementioned second type of semi-rimless eyeglass frames include:

concave check, maximum radius check, minimum radius check, and minimum radius revision performed when the minimum R value is below a certain value.

According to the twentieth constitution above, (23) the method for changing the type of eyeglass frames is a method wherein the abovementioned data revision operations for changing from the abovementioned first type of semi-rimless eyeglass frames to the abovementioned second type of full-rimmed eyeglass frames include:

determining closing block position, radius check for closing block position, and radius revision for closing block position performed when that R value is below a certain value.

According to the twentieth constitution above, (24) the method for changing the type of eyeglass frames is a method wherein the abovementioned data revision operations and data addition operations are performed with computer simulation methods.

According to the twenty-fourth constitution above, (25) the method for changing the type of eyeglass frames is a method wherein an image of the eyeglasses worn on the face is generated and displayed on a display screen, by capturing a face image of the eyeglass consumer and laying an eyeglass frame image, according to data relating to said eyeglass frames, over the face image; and said data revision operations and data revision operations are performed on screen, in the case where data revision operations and data addition operations are performed with computer simulation methods.

BRIEF DESCRIPTION OF THE DRAWINGS

FIG. 5 shows an example of the portrait imaging screen in the made-to-order system relating to the embodiments;

FIG. 8 shows an example of the trial screen in the made-to-order system relating to the embodiments;

FIG. 9 shows an example of the screen for comparing/examining in the made-to-order system relating to the embodiments;

FIG. 13 is a diagram for explaining the present invention; (a) shows the relationship between the portrait reference points found in FIG. 11(a) and the positions where the reference points of the frames are established; (b) shows an image of the portrait overlaid with the frame image;

FIG. 14 is a diagram for explaining the present invention; (a) shows an example of the entire portrait being unbalanced when the line between corneal vertexes is matched to the horizontal reference line on screen; (b) shows the state where the portrait is manually rotated and the portrait's balance is restored;

FIG. 15 is a diagram for explaining the present invention; (a) shows the relationship between the reference points of the portrait manually revised as shown in FIG. 14 and the positions where the reference points of the frames are established;

FIG. 16 is a diagram for explaining how the profile portrait is handled on screen in the present invention; (a) shows how the eye points are found from the corneal vertexes and the portrait is overlaid with the lens profile images with those points as the references; (b) shows the references for the frame image established using the lens profile image;

FIG. 17 is a diagram for explaining how the frontal portrait is handled on screen in a conventional example; (a) shows the state where the corneal vertexes are found on the portrait and the line between corneal vertexes is drawn; (b) shows the state where the center position of the abovementioned line is established as a reference point;

FIG. 19 shows an example of the screen in the case of data revision operations and data addition operations in the first embodiment being performed on screen with a computer simulation method;

FIG. 21 is a drawing for explaining the determination of the closing block position in the first embodiment;

FIG. 23 is a drawing for explaining the determination of the closing block position in the first embodiment;

FIG. 27 shows an example of the computer graphics screen when carrying out the method for determining the positions of the eyeglass endpieces and bridge relating to the embodiments of the present invention;

FIG. 29 is a drawing to explain the method for determining the positions to which the bridge can be moved in the embodiments of the present invention;

FIG. 32 is a drawing to explain the method for determining the positions to which the endpieces can be moved in the embodiments of the present invention;

FIG. 34 is a drawing to explain the method for determining the positions to which the bridge can be moved in the embodiments of the present invention;

FIG. 35 is a drawing to explain the method for determining the positions to which the bridge can be moved in the embodiments of the present invention.

BEST MODE FOR CARRYING OUT THE INVENTION

Figure 1:
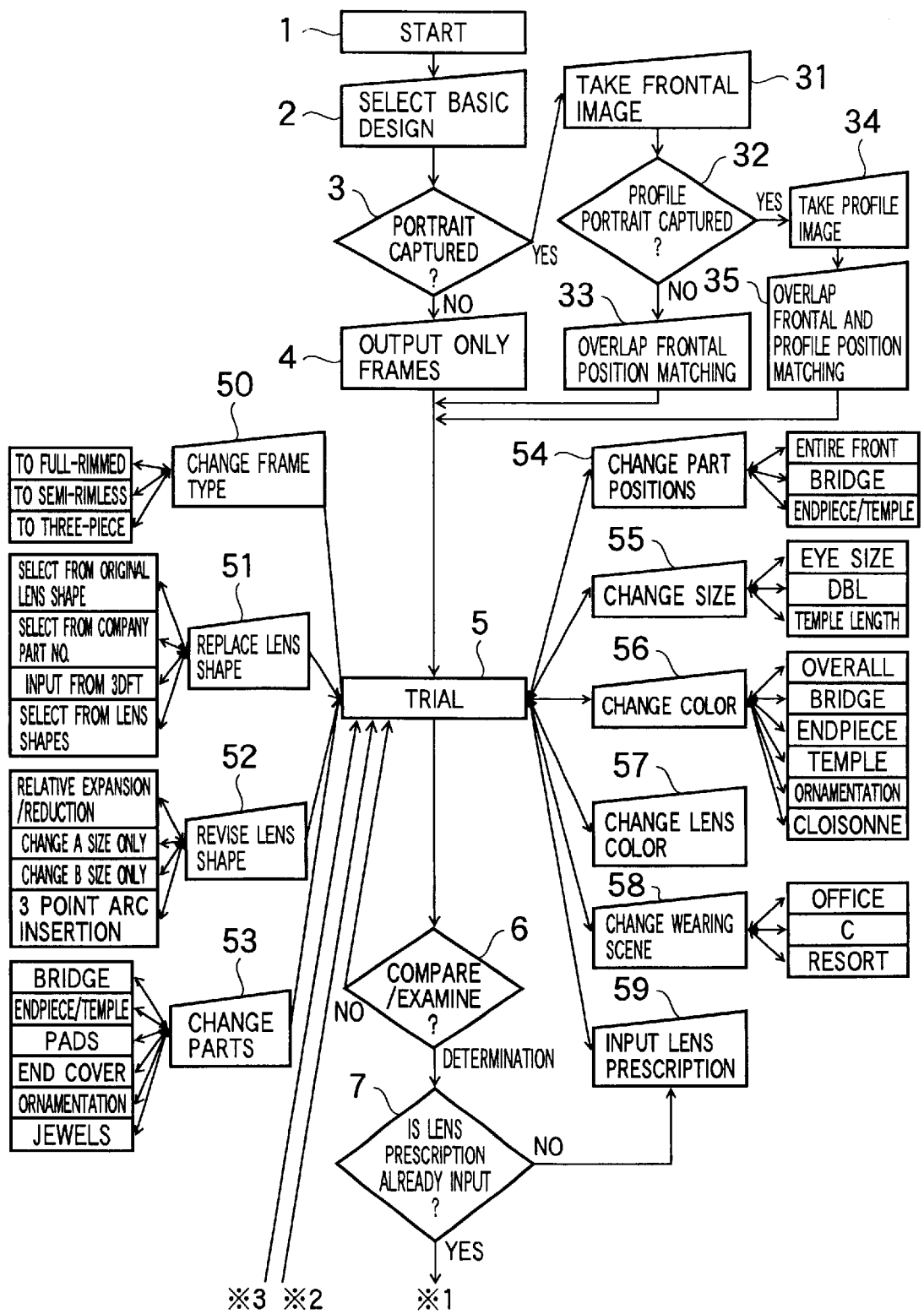
FIG. 1 is a flow chart showing a summary of the eyeglasses made-to-order system relating to the embodiments of the present invention.
Figure 2:
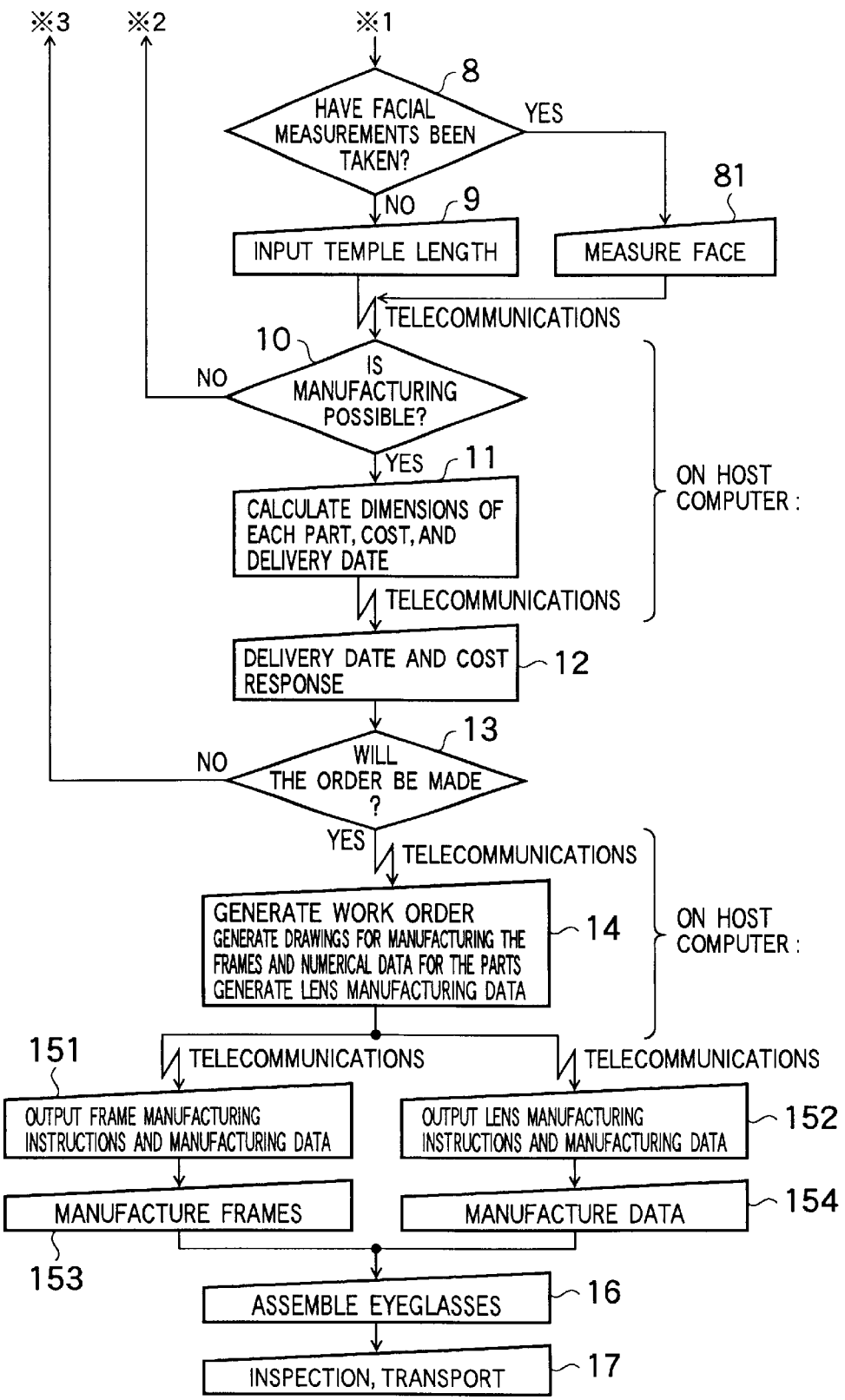
FIG. 2 is a flow chart showing a summary of the eyeglasses made-to-order system relating to the embodiments of the present invention.
Figure 10:
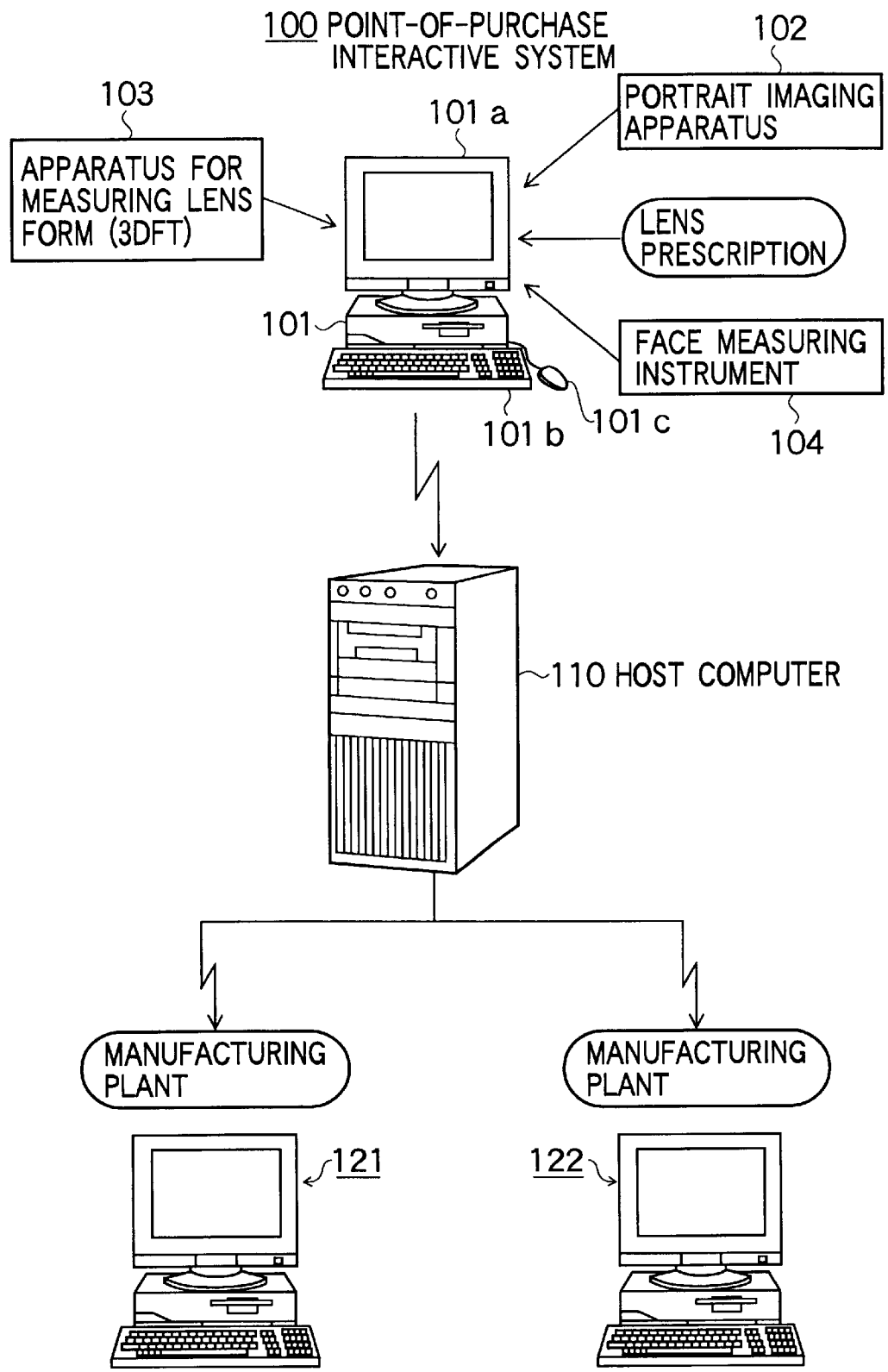
FIG. 10 is a block diagram showing a summary of the hardware constituting the made-to-order system relating to the embodiments.

FIGS. 1 and 2 are flow charts showing an outline of the eyeglasses made-to-order system relating to the embodiments of the present invention. FIGS. 3 through 9 are diagrams showing examples of the screens used in the made-to-order system relating to the embodiments. FIG. 10 is a block diagram showing an outline of the hardware comprising the made-to-order system relating to the embodiments. Below, the eyeglasses made-to-order system relating to the embodiments is explained with reference to these figures.

As shown in FIG. 10, the hardware for the made-to-order system in the present embodiment comprises a point-of-purchase interactive system 100, a host computer 110 connected by telecommunications lines to this point-of-purchase interactive system 100, and terminal devices 121, 122 in the manufacturing plant connected by telecommunications lines to this host computer 110.

The point-of-purchase interactive system 100 is principally a computer apparatus comprising a computer 101, an output apparatus such as a display screen (monitor) 101a, and an input apparatus such as a keyboard 101b or mouse 101c. As necessary, the point-of-purchase interactive system may further include a portrait imaging apparatus 102 comprising a digital camera or CCD camera for inputting portrait images to the computer apparatus, and a lens shape measuring instrument (three-dimensional frame tracer (3DFT)) 103 for measuring the lens shapes of the frames selected by the consumer and inputting the measurements to the computer apparatus. The operator of this point-of-purchase interactive system 100 may be either an employee of the eyeglass shop or an eyeglass purchaser.

Program software is installed on the computer 101. With this software, the operator selects any of the frames representing a plurality of basic designs, prepared in advance and displayed on the abovementioned display screen 101a; then, based on the basic design of the selected frames, the operator can decide upon, and order from the screen, the optimum eyeglass specifications, according to the consumer's preferences, by changing various elements constituting the eyeglasses, such as the various frame types, lens shapes, and parts. A summary of the functions of this stored software is as follows.

a. Basic design selecting function for selecting any of the frames representing a plurality of basic designs, prepared in advance and displayed on the display screen 101a.

b. Portrait capturing function for capturing the portrait of the eyeglass user (eyeglass purchaser), imaged with a portrait imaging apparatus 102.

c. Synthetic image generating function for overlaying the image of the selected frames on the portrait of the eyeglass user imaged with the portrait imaging apparatus 102, and displaying the image of the portrait wearing the eyeglasses on the display screen 101a.

d. One or more changing functions for changing, revising, or inputting necessary items on screen, from among a plurality of elements constituting the eyeglasses, such as various frame types, lens shapes, and parts, with the basis being the basic design of the frames selected using the basic design selecting function.

e. Storing function for storing data including one or more images of the eyeglasses created on screen.

f. Comparing/examining function for displaying on screen one or more images of the eyeglasses, including the eyeglass images stored by the storing function, then comparing and examining those images and deciding upon, or not, any of the eyeglasses, or deciding whether to return to the step for performing the abovementioned changing functions.

g. Function for allowing the operator to select any one or more of the functions after selecting the basic frame design using the basic design selecting function: the portrait capturing function for capturing a portrait imaged with a portrait imaging apparatus 102, the synthetic image generating function, the one or more changing functions, or the comparing/examining function.

Because it includes the abovementioned functions, the system in this embodiment is characterized by allowing the operator to perform only those procedures or functions thought necessary after selecting the basic frame design, and allowing prompt and accurate ordering of the design best representing the will of the eyeglass consumer.

In addition to the function for overlaying the frontal image of the selected frames on the frontal image of the eyeglass consumer's face captured with the abovementioned portrait capturing function, the abovementioned synthetic image generating function further includes the function of overlaying the side image of the selected frames on the profile image of the eyeglass consumer's face captured with the abovementioned portrait capturing function. It is thereby possible to confirm the profile portrait with the eyeglass frames in use, as well as the frontal portrait with the eyeglass frames in use; this makes possible the judgement and selection of a comprehensive design in determining the eyeglass frames.

The abovementioned one or more changing functions may include one or more of the following: frame type changing function, lens shape replacing function, lens shape revising function, part changing function, size changing function for changing sizes such as eye size and the distance between the lenses, color changing function for changing the colors of the frame parts, lens color changing function, usage scene changing function for changing the background of lens use, or lens prescription input function.

Furthermore, another function is one wherein, after the abovementioned comparing/examining function is performed and the principal eyeglass specifications and image are determined, facial measurements are made using the face measuring instrument 104 and those measured values are added and the eyeglass specifications are revised. The eyeglass frame data are revised based on the relative positions of each part of the eyeglasses determined according to the simulation image and the facial measurement values attained. In this way, appropriate revisions based on precise three-dimensional data of the face according to facial measurements are added to the eyeglass specifications determined with a two-dimensional simulation displayed on the display screen 101a. This makes it possible to attain optimal eyeglass specifications which can be used as manufacturing data for manufacturing eyeglasses to fit the face.

Specifically, in real three-dimensional faces, there are differences in nose width and height because the form of the nose structure differs among individuals. The eyeglass specifications are revised in order that the appearance of the two-dimensional eyeglass specifications not be lost due to the individual differences appearing in the three-dimensional wearing state with the frames supported by the pads.

Figure 36:
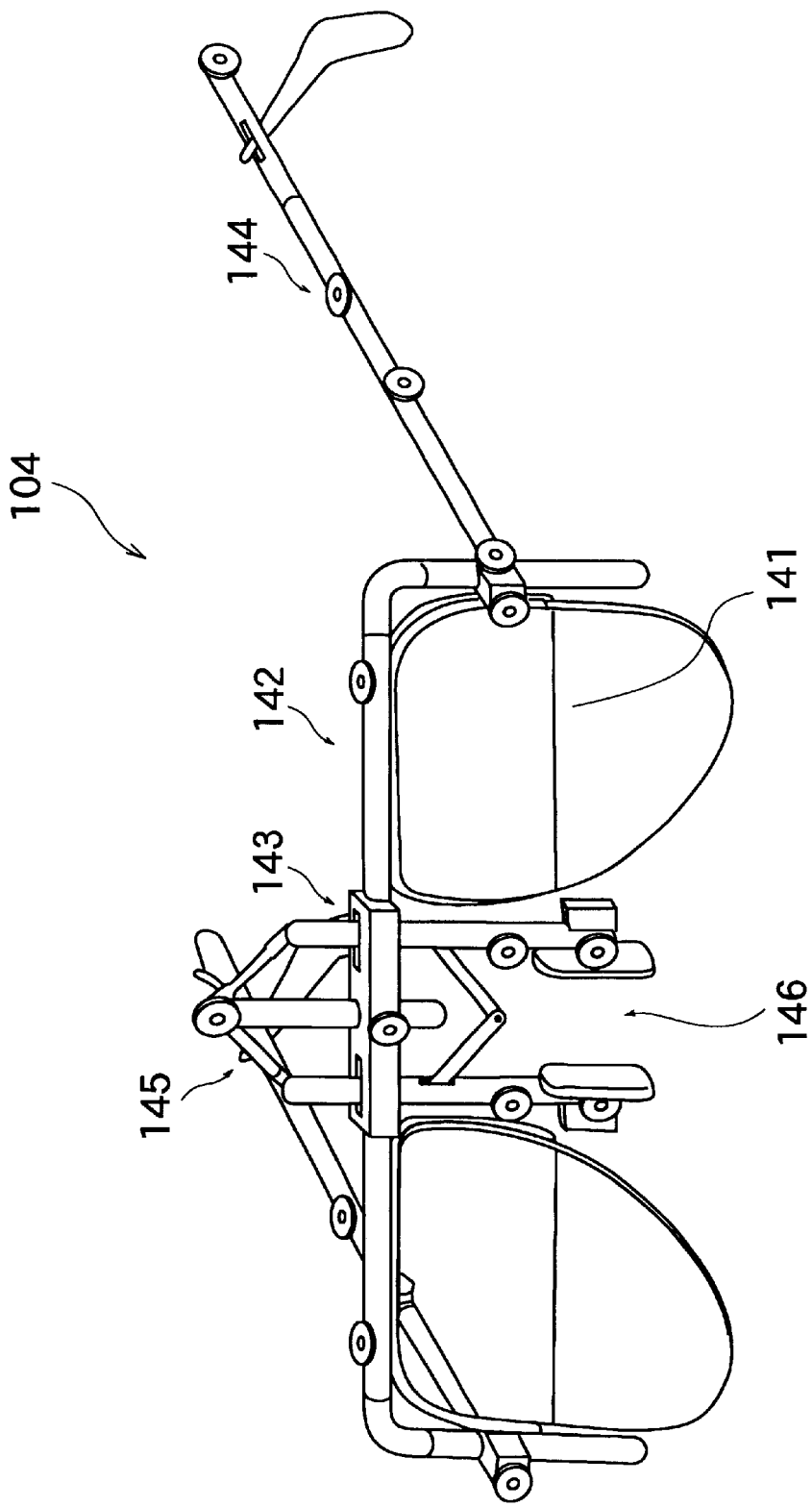
FIG. 36 shows the apparatus for taking facial measurements.

The face measuring instrument 104 comprises parts corresponding to the parts comprising eyeglasses as shown in FIG. 36, for example. The face measuring instrument therefore comprises temple portions and a front portion comprising lenses showing the horizontal reference line 141 connecting the frame centers of both lenses, lens frames, pad portions, bridge portion, and endpiece portions. The length of each of these parts and the relative positions and angles between the parts can be adjusted; these lengths and relative positions and angles are displayed by graduations or the like and can be measured. Moreover, the face measuring instrument 104 in FIG. 36 comprises a lens position information display portion 142, front information display portion 143, and temple information display portion 144. A bridge information display portion 145 and pad information display portion 146 are established on the front information display portion 143. Using this type of face measuring instrument, the length, position, angle, and the like of each part are adjusted, with the person to be measured wearing the face measuring instrument, so as to maintain the relative positions of the frame center and eye point location (pupil location) on the simulation screen. The following are measured as required items and manufacturing data are attained: eye point position, pad interval, pad height, pad depth, pad angles to the front and rear, front width, endpiece inclination, and temple length (other measured items, as necessary, include vertical pad angle, front inclination, endpiece height, endpiece opening angle, earpiece bending angle, and the like). (For example, Japanese Utility Model No. S63-110355, Japanese Patent Application No. H9-304374, and Japanese Patent Application No. H9-306003)

The program software stored in the abovementioned computer 101 also has an order check access function for accessing the order check database comprising data, including data necessary for eyeglass manufacturing, after the eyeglass specifications are determined and getting the information necessary when the eyeglasses are ordered including the delivery data and the possibility and cost of manufacturing eyeglasses to those specifications.

Furthermore, the abovementioned software also has an order access function for accessing the order database comprising data including order processing, data processing necessary for manufacturing the ordered eyeglasses, and instruction processing necessary for eyeglass manufacturing, and completing the order after the order check access function is performed and the order is determined.

Moreover, the abovementioned order check database and order database are stored in the host computer 110.

In addition to the order check database and the order database, the host computer 110 also has the function of generating a work order based on the order data and sending the data necessary for manufacturing the frames and lenses to the terminal apparatuses 121 and 122 in the manufacturing plant.

Next, the operating procedures in the case of placing an order with the eyeglasses made-to-order system with the abovementioned constitution are explained with reference to FIGS. 1 through 9. Accordingly, the aspects of the glasses made-to-order system relating to the present embodiment are explained in greater detail.

Figure 3:
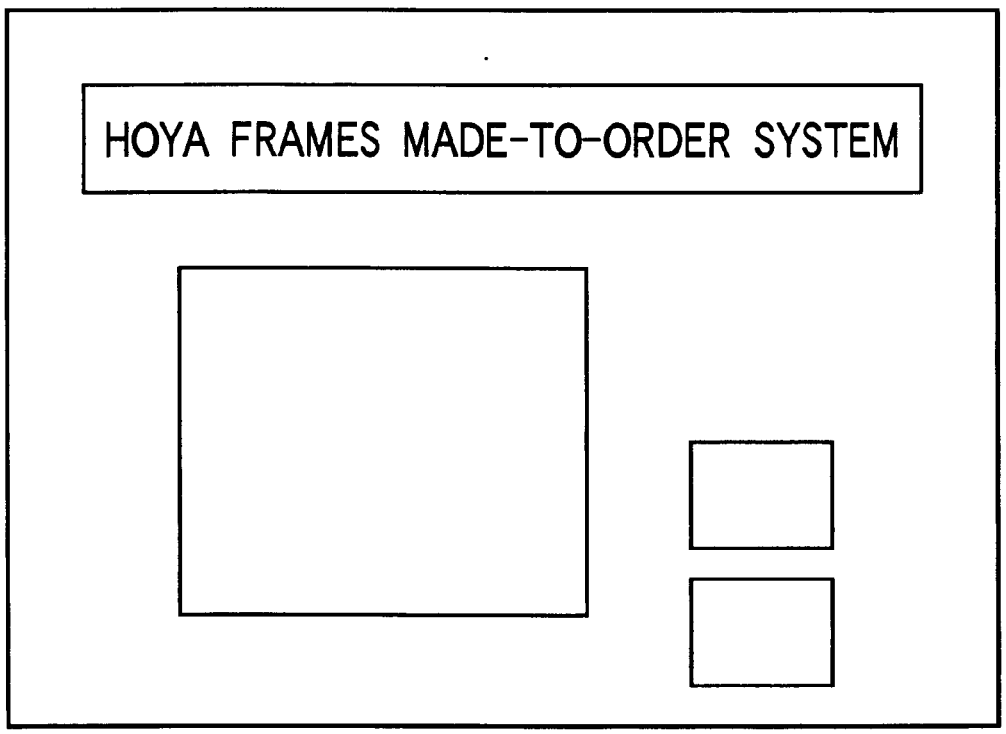
FIG. 3 shows an example of the opening screen in the made-to-order system relating to the embodiments.

The eyeglasses made-to-order system is started through the keyboard 101*b* or mouse 101*c* of the interactive system 100 (step 1). The display screen then shows the opening screen, as shown in FIG. 3. In this step 1, a slide show screen, for showing an overview of the eyeglasses made-to-order system, can be selected; a screen saver can also be turned on as necessary.

Next, the operation to advance to the next step is performed through the keyboard 101*b* or mouse 101*c*. This operation is carried out by clicking a prescribed location on the screen with the mouse 101*c* or by operating a prescribed key on the keyboard 101*b*. Moreover, in the following explanation, the same types of operations are performed when advancing to the next step.

Figure 4:
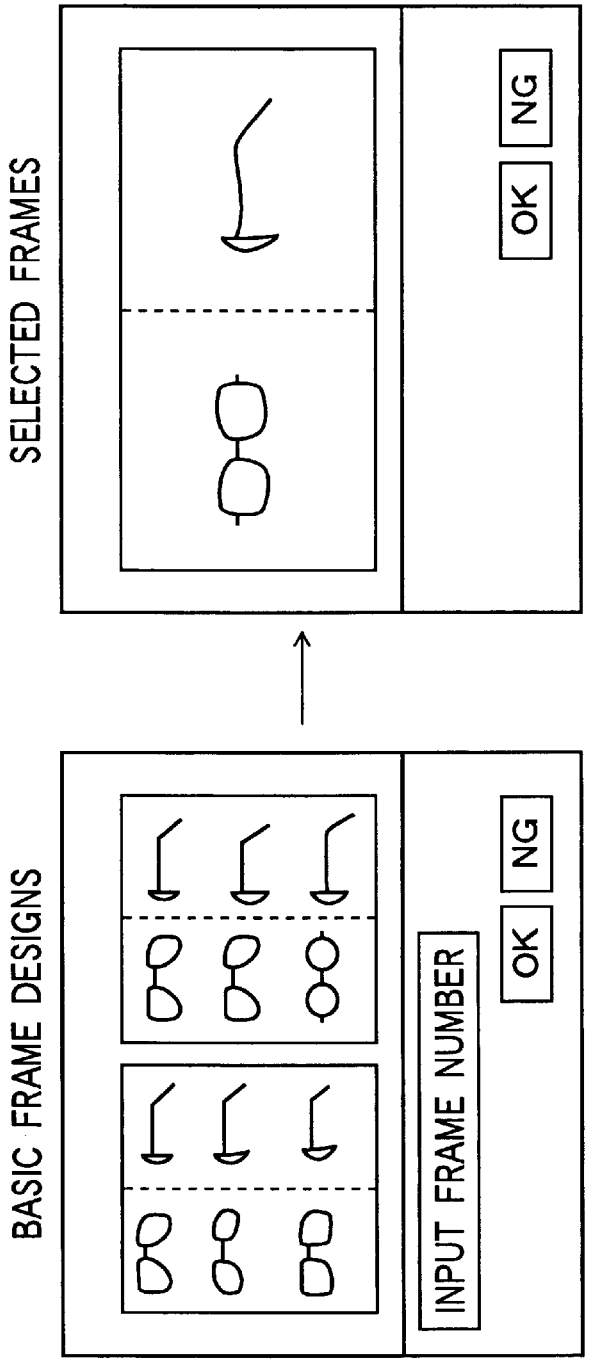
FIG. 4 shows an example of the basic design selection screen in the made-to-order system relating to the embodiments.

Upon advancing to the next step from the abovementioned opening screen, the display screen becomes the screen for selecting the basic design, as shown in FIG. 4 (step 2). This step is the step for selecting the frames to form the basis for the design. In this step, the operator selects the preferred frame image, from among a plurality of frame images of basic designs previously stored in the computer. As frames to form the basis for the design, frames with a plurality of designs are established for each frame type (rimless, semi-rimless, or full-rimmed, etc.) and are displayed on the screen. The frame images include side views as well as frontal views, so that the overall design can be more precisely grasped. Moreover, the basic frame designs are not prepared in advance so that the operator has to make a final selection from among these prepared designs. Instead, because it is not practical for the operator to design the eyeglass frames from the beginning, having this set of basic designs makes it possible for the operator to indicate a model to use as a basis and then quickly and appropriately make a design based on the basic model by changing each portion according to the preferences.

Upon the selection of the basic frame design in the abovementioned step 2, the process advances to the next step, portrait capturing (step 3). Moreover, the order of steps 1 and 2 may be reversed. Step 3 can be omitted with a pass operation when the operator decides it is not necessary and the process advanced to the next step for displaying and outputting the frames only (step 4).

When the operator chooses portrait capture, a frontal image of the face is imaged with the portrait imaging apparatus 102 and that image is captured by the computer (step 31). Next, on the display screen, the operator selects whether to have a profile image made (step 32). When the operator chooses to have a profile image made, a profile image is made (step 34) and the overlap, laying the abovementioned selected frames on the frontal image and profile image, is performed by the computer (step 35). When the operator chooses not to have a profile image made, the overlap, laying the abovementioned selected frames on the abovementioned frontal image, is performed by the computer (step 33).

Figure 6:
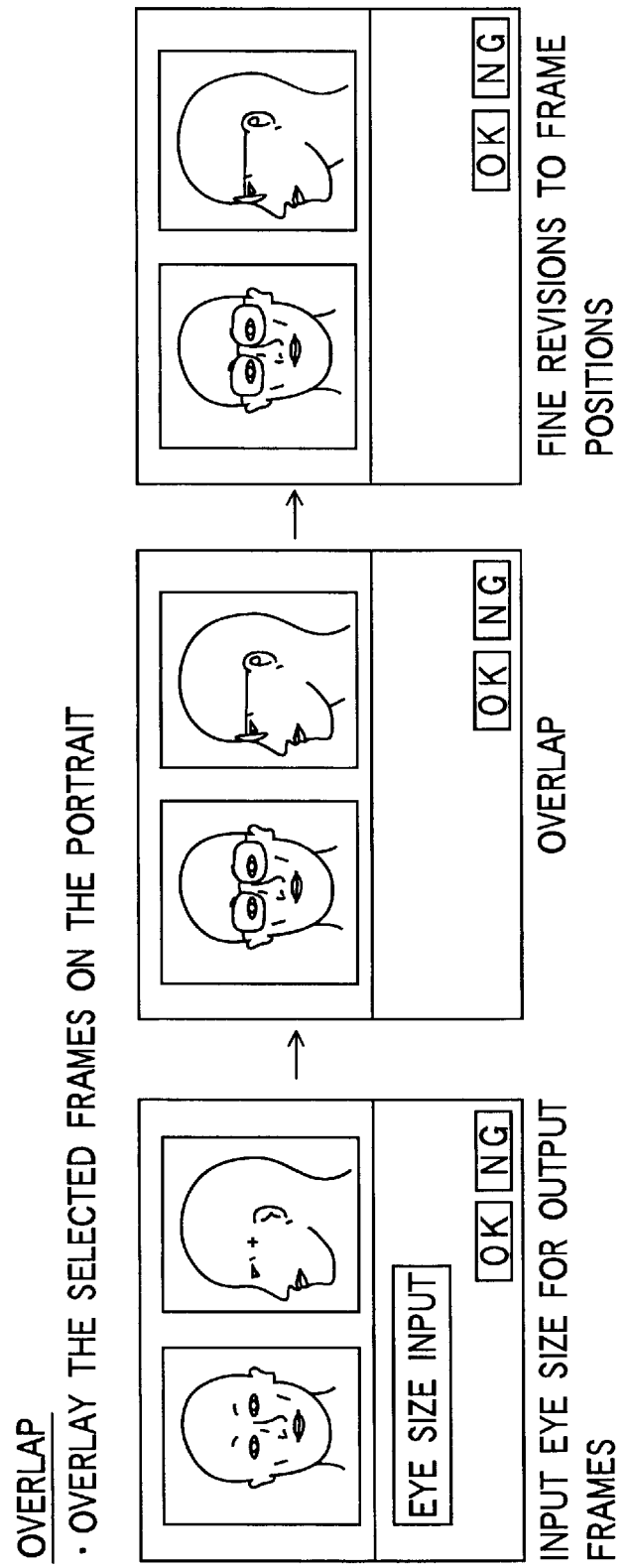
FIG. 6 shows an example of the overlap screen in the made-to-order system relating to the embodiments.
Figure 7:
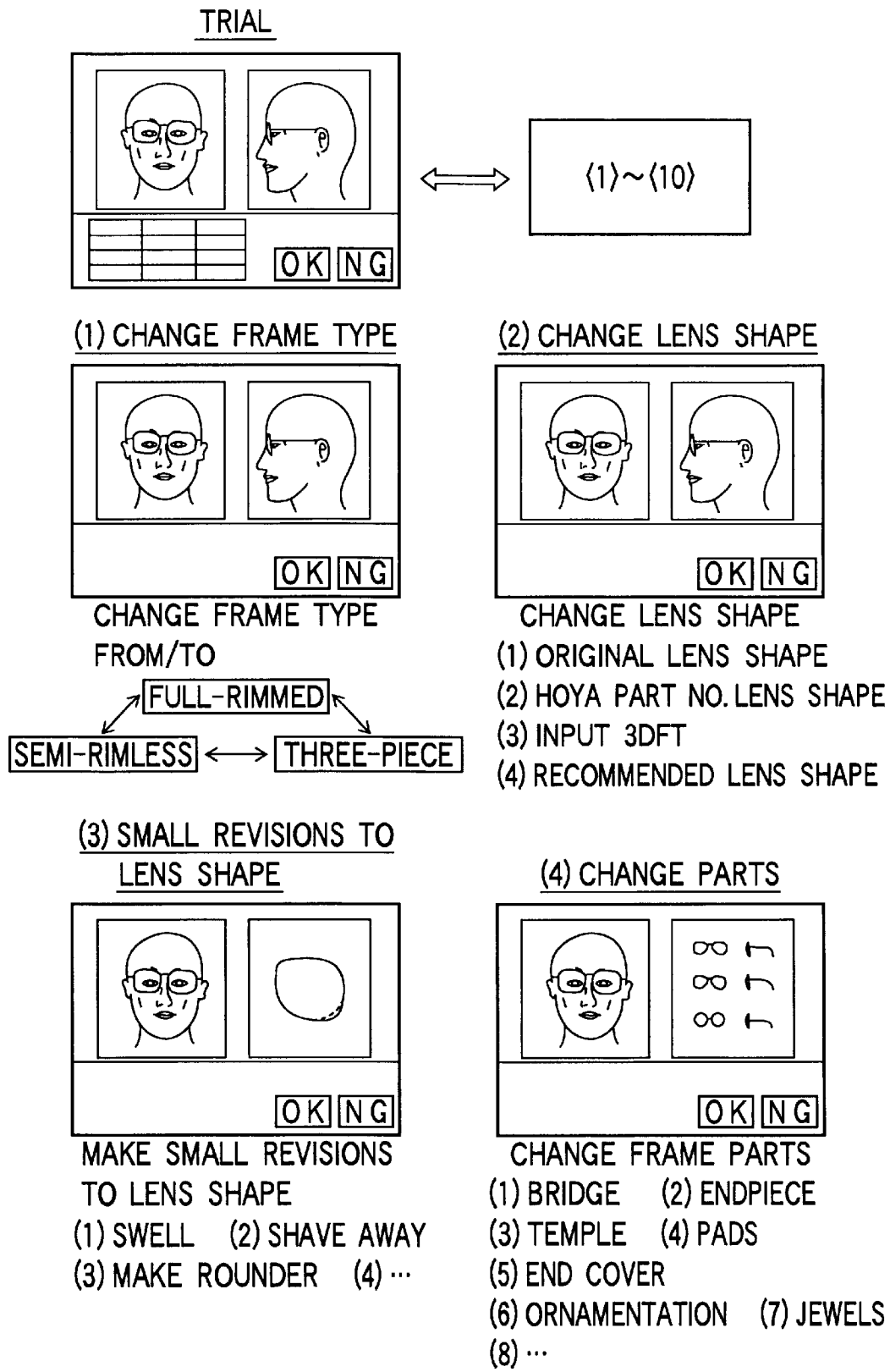
FIG. 7 shows an example of the trial screen in the made-to-order system relating to the embodiments.

FIG. 5 shows the screen displaying the portrait captured by imaging. FIG. 6 shows the screen for the overlap process. For the captured frontal portrait, the PD pupil distance values, which are the positions of corneal vertexes, distance between corneal vertexes, and distance between pupils, are input from the screen. For the captured profile portrait, the corneal vertex positions, ear contact point (OBS point, or bending point of the end cover), and the temple disappearance point, which is the point where the temple disappears into the hair, are input in the same way from the screen as reference points. During overlap, the frame image is laid over the portrait image using a method for matching these reference points to points corresponding to the frame on the screen using enlargement or reduction. During this overlap, the frame size is adjusted and input with consideration given to the design of the selected frames, the size of the face in the portrait, the power of the mounted lenses, and so forth. In consideration of the fact that the sides of the face are not symmetrical, the portrait is rotated on the screen and corrected as necessary; this makes for a more natural face image and allows the consumer to make a more appropriate evaluation.

Next, the synthetic image generating method, for overlaying the frame image on the portrait image in steps 33 and 35 for the abovementioned overlap, is explained in further detail using FIGS. 11 through 16. Moreover, the synthetic image generating method explained using FIGS. 11 through 16 can be used as a synthetic image generating method in an eyeglass wearing simulation apparatus, in a usual design process or the like, as well as for the eyeglasses made-to-order system in the present embodiment. This method can also be used in the case of overlaying an image of an existing eyeglass frame on a portrait image on the screen and showing the portrait wearing the eyeglasses.

The simulation apparatus applying this synthetic image generating method comprises a display for displaying the screens, a database storing eyeglass frame information, a computer including various input devices, and a camera for imaging the face and left and right profiles of a person and inputting the static image data to the computer. The computer can fetch the portrait for the person imaged with the camera to the display screen, while reading the necessary frame image information from the database, and overlaying the frame information on the portrait on screen while applying appropriate revisions.

Figure 11:
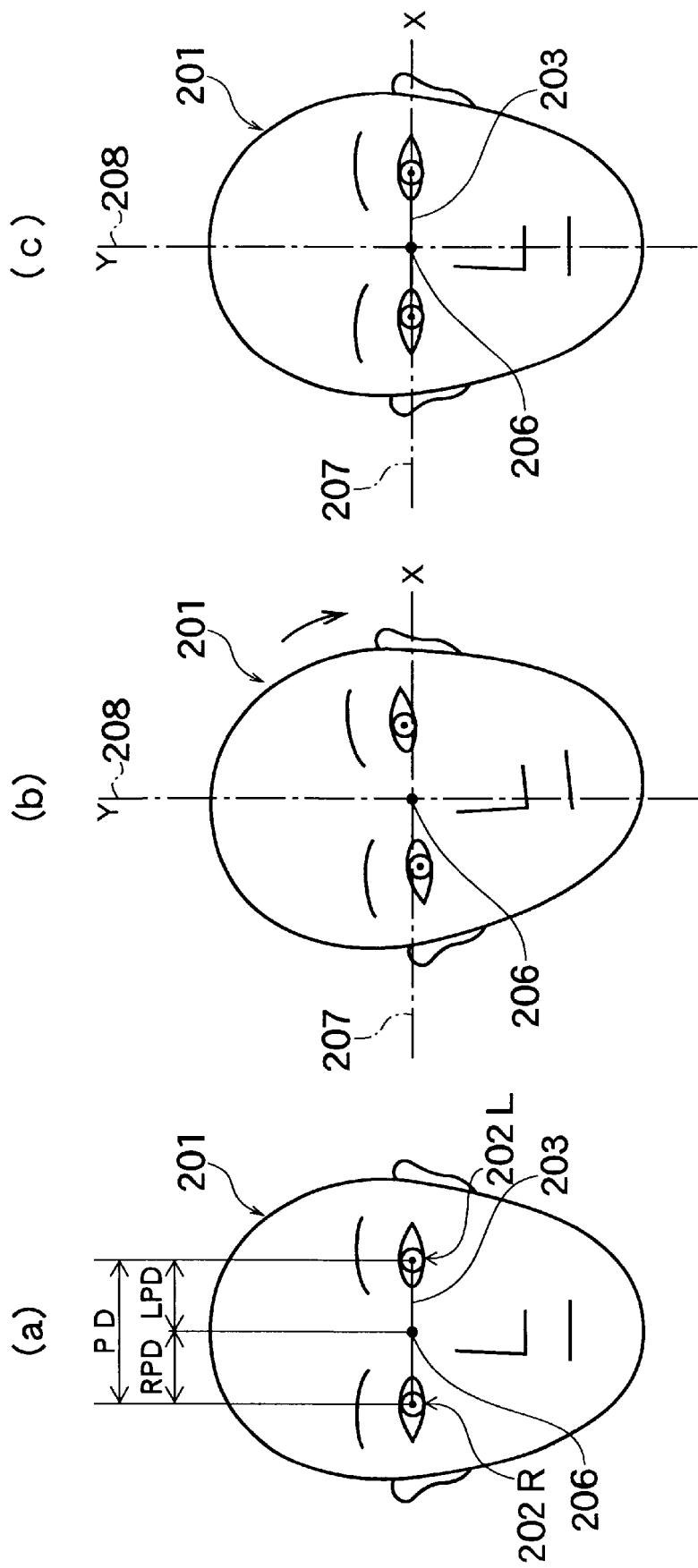
FIG. 11 is a diagram to explain the capture of the frontal portrait on screen in the present invention; (a) is a figure for explaining how to set the portrait reference points; (b) is a figure showing the relationship between the portrait ad the reference lines on screen; and (c) is a diagram showing the rotation of the portrait so that the line between corneal vertexes matches a horizontal reference line on screen.

In this synthetic image generating method, the center of the bridge of the nose (center of the pupilometer pad position) of the frontal portrait 201 on screen is found as a reference point 206 as shown in FIG. 11; meanwhile, the portrait 201 is rotated and returned to a correct position.

As the first step in this procedure, as shown in FIG. 11(a), the coordinates of the corneal vertexes 202L and 202R for the right and left eyes in the portrait 201 are found by clicking on the image; a line segment (below Aline between corneal vertexes) 203 connecting the corneal vertexes 202L, 202R is drawn. Then, this method uses the ratio between the actual corneal vertex distances of both eyes, measured using a pupilometer in the previous prescription preparing stage, in effect the measured values LPD, RPD (known values) of the distances from the nose position (bridge of nose) to each of the corneal vertexes (corresponding to center of pupils). The line between corneal vertexes 203 on the abovementioned portrait 201 is divided proportionally using that ratio; the point of division is the reference point 206 for eyeglasses worn on the portrait 201.

At the same time, the ratio between the actual distance between corneal vertexes PD (=LPD+RPD) and the distance between corneal vertexes on the portrait 201 is found; the portrait 201 is enlarged or reduced by that percentage so as to match the display magnification of the predetermined eyeglass frame image later read onto the screen. For example, if the display magnification of the frames is one, the magnification of the portrait is also set to one; if the display magnification of the frames is one half, the magnification of the portrait is also set to one half. In this case, the percentage of reduction or enlargement is stored temporarily because it is also used for the reduction or enlargement of the profile image. Naturally, the magnification of the frame display may also be adjusted to the portrait magnification, because it is good for the frame display magnification to match the portrait magnification.

With the magnification of the portrait 201 adjusted in this way, the horizontal reference line (X axis) 207 and vertical reference line (Y axis) 208 on the screen are then displayed as supplementary lines passing through the reference point 206 of the portrait 201 as shown in FIG. 11(b). Specifically, when the portrait is taken, it is sometimes impossible to capture the image with the face being horizontal. For this reason, the reference lines, for indicating the relative positions, are included in order for making adjustments to the inclination of the face. As shown in FIG. 11(c), the portrait 201 is rotated around the reference point 206, based on means for rotating the portrait with an automated operation, so that the line between corneal vertexes 203 matches the horizontal reference line 207. The processing of the portrait 201 is thereby completed.

Figure 12:
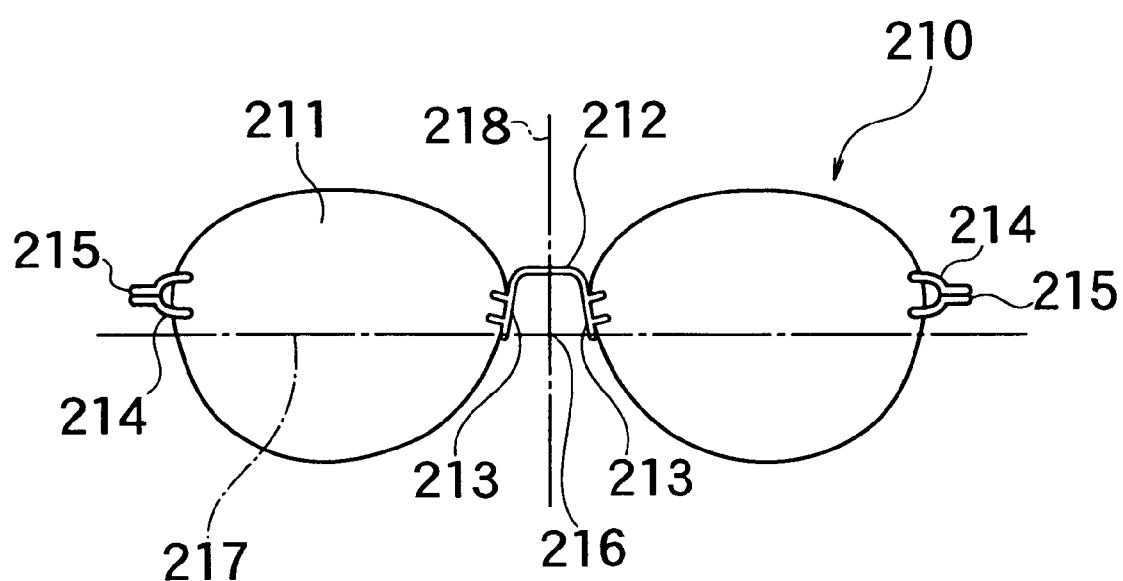
FIG. 12 shows an example of the frontal image of the eyeglass frames in the present invention.

Meanwhile, the eyeglass frame image 210 illustrated in FIG. 12 comprises the lenses 211, bridge 212, pads 213, endpieces 214, temple 215, and so forth. The point of intersection of the horizontal line (datum line) 217, connecting the geometrical centers (centroids) of the forms of the right and left lenses 211, and the vertical line (frame center line) 218, passing through the center of the bridge 212, is established as the reference point 216 for the frames 210.

Next, the portrait is overlain with the eyeglass frame image. In that case, the frame design preferred by the consumer is selected from among various types of frame designs and the position at which the frames are placed on the portrait is established. As shown in FIG. 13(a), the reference point 216 of the frames is established at a prescribed distance from the reference point 206 of the portrait 201; here, this is a position 3 mm therebelow (Y=−3). As shown in FIG. 13(b), placing the frame image 210 at this position produces an image simulating eyeglass wearing, with consideration of the lack of bilateral symmetry of the portrait. At this stage, means for moving the frame image can be used to make slight adjustments to the rotation of the portrait 201 and to correct the vertical position of the frame image 210.

Moreover, as shown in FIG. 14(a), there may be an inclination of the overall balance of the portrait 201 (for example, when the eyes are not horizontal with respect to the entire face), when the line between corneal vertexes 203 of the portrait 201 is matched by automatic rotation to the horizontal reference line 207 on the screen. In that case, the portrait 201 is again corrected by manual rotation around the reference point 206 so that the frames are placed horizontally and so that the overall portrait is balanced after automatic rotation and revision as shown in FIG. 14(b). The reference point 216 of the frame image is established as shown in FIG. 15(a) and the frame image 210 overlaid as shown in FIG. 15(b).

As discussed above, the positions are adjusted and corrected by rotating (automatically and manually) the portrait without rotating the frames. For this reason, rotary calculations become unnecessary in any subsequent calculations for transforming the frames and the amount of operations can be reduced.

Next, the method for synthesizing a profile image to simulate eyeglass wearing is explained using FIG. 16.

The previously captured profile portrait 201S is reduced or enlarged according to the magnification used to enlarge or reduce the frontal portrait discussed above. Next, as shown in FIG. 16(a), the corneal vertex 221 and bending point (point where the temple bends around the ear) 227 of the profile portrait 201S are isolated. The points 221 and 227 are connected by a line 222. The point on a line extending from this line 222 which is a prescribed distance d (for example, d=12 mm) from the corneal vertex 221 is designated the eye point (reference point) 223.

Next, the cross sectional image 225A of the lens is laid over this eye point 223, so that the eye point 223 matches the eye point (intersection of the optical axis of the lens and the back surface of the lens) of the prescription lens. The central axis of the frames (or FC axis) 226 is established parallel to and 3 mm (value determined from the lens prescription including the lens form) downward from the line 222 connecting the corneal vertex 221 and the bending point 227. The FC axis 226 is a line normal to the front surface of the frame (reference surface established to include both lens shapes) and which passes through the geometrical centers (centroids) of both lens shapes. Then the lens cross sectional image 225A is rotated around the eye point 223 so that this FC axis 226 is inclined at a prescribed angle (preferably 3 to 8°, and more preferably 50°) to the line 222, and the lens cross sectional image 225B is attained. Next, the lens profile image 225C, corresponding to this inclined lens cross sectional image 225B, is displayed as shown in FIG. 16(b). The synthesized image with the prescription lens actually positioned before the eye is thereby attained.

Next, the fixed endpiece position 228 extracted from the frontal frame image is reflected and plotted on the lens profile image 225C. The fixed endpiece position 228 and bending point 227 are connected with a line 229 and the frame profile image is laid over that line 229 so that the temple matches that line 229. An image simulating the profile view is thereby attained. Moreover, when there is a temple disappearance point 231 which is the boundary point where the temple disappears into the hair 230 on the side of the face as shown in FIG. 16(*b*), this temple disappearance point 231 is extracted and the temple portion toward the end is deleted from the temple disappearance point 231. Moreover, the temple disappearance processing may use the boundary line of the hair instead of the temple disappearance point.

In this way, the eyeglass consumer can select eyeglasses while looking at the frontal simulation image and profile simulation image. Moreover, in the abovementioned embodiment, measured values of the distances of the right and left corneal vertexes from the nose position are used for determining the portrait reference points. However, the reference points for the portrait may also be established using other measured values (for example, distance from the right and left ear positions).

Once the step for displaying and outputting only the abovementioned frames in FIG. 1 (step 4) or the abovementioned overlap step (steps 33, 35) is complete, the process advances to the next trial step (step 5).

The trial step (step 5) is the step for selecting one of the following: to advance to one of the steps (steps 50 to 59, <1> to <10> in FIGS. 7 and 8) for the one or more change operations for changing, revising, or inputting necessary items on screen for each of the plurality of structural members of the eyeglasses including various frame types, lens shapes, and parts, based on the frames with the basic design selected in the abovementioned basic design selection step (step 2); or the step to omit these steps and advance to the comparing/examining step (step 6) for deciding whether to use the frames without changes to the selected basic design.

Step 50 is the step for changing the frame type. This step is executed when the operator wants to change the type (frame type) of frames with the basic design selected in step 2. For example, in the case where the type of frames selected in step 2 is the rimless frame (also called A three-piece frame), the operator can change to another type of frame (semi-rimless or full rimmed), while retaining the basic design when the consumer does not like the frames when those frames are placed on the screen in the overlap step. In some cases, it is not possible to make this change to another type because of structural aspects and so forth of the frame design; the denial of the change is determined automatically and the items which make necessary the change denial are displayed.

Next, the method for changing eyeglass frame type, used in step 50 for changing frame type, is explained in further detail using FIGS. 18 through 26. This method for changing eyeglass frame type is a method which can change the type of frames without changing the design image. Moreover, the method for changing the eyeglass frame type explained using FIGS. 18 through 26 can be used in the case of generating design and manufacturing data when changing the frame. type for existing eyeglass frames, for example, in the usual process for eyeglass design and manufacturing, as well as in the eyeglasses made-to-order system in the present embodiment.

Figure 18:
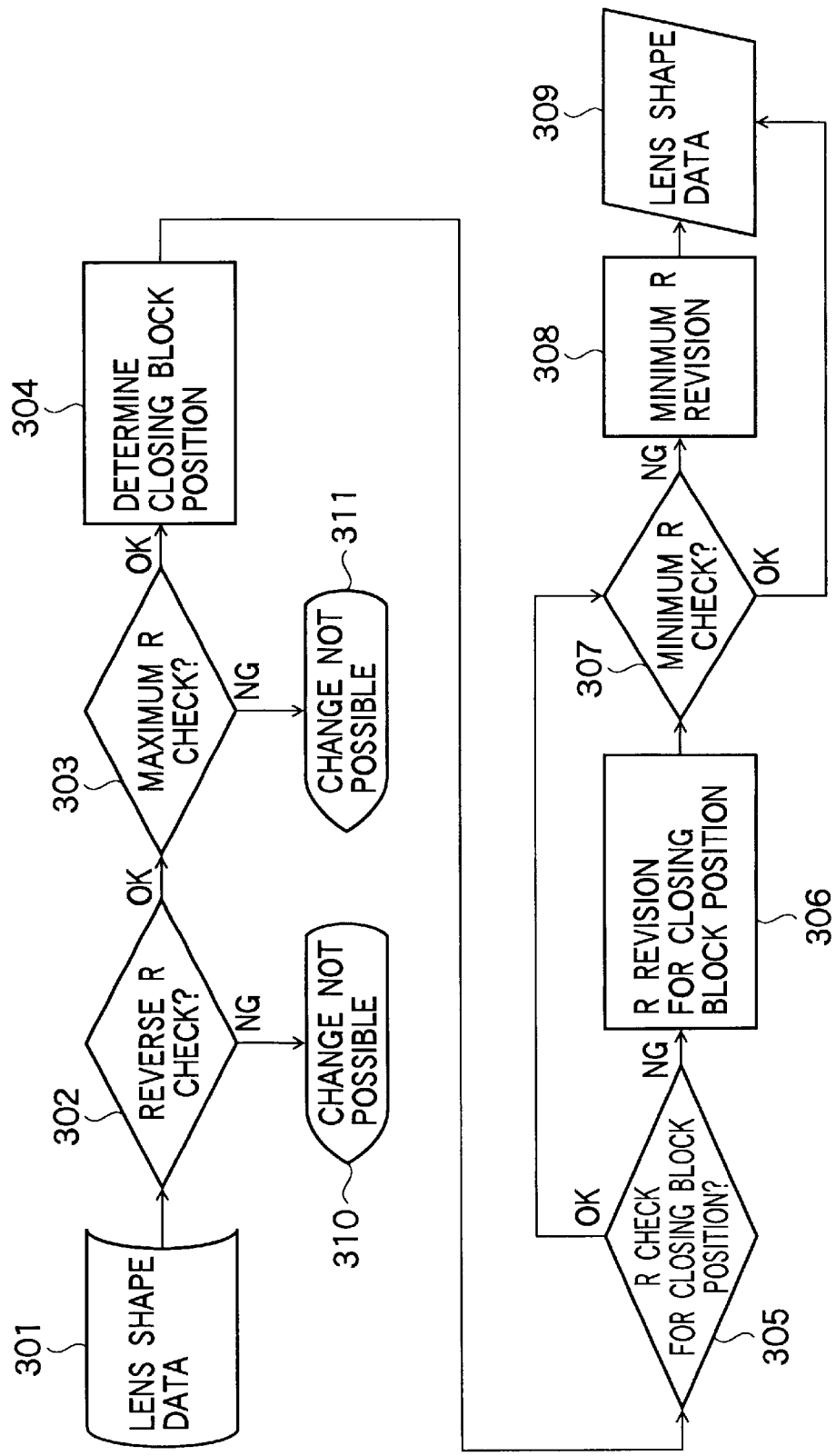
FIG. 18 is a flow chart showing the method for changing frame type relating to the first embodiment.
Figure 20:
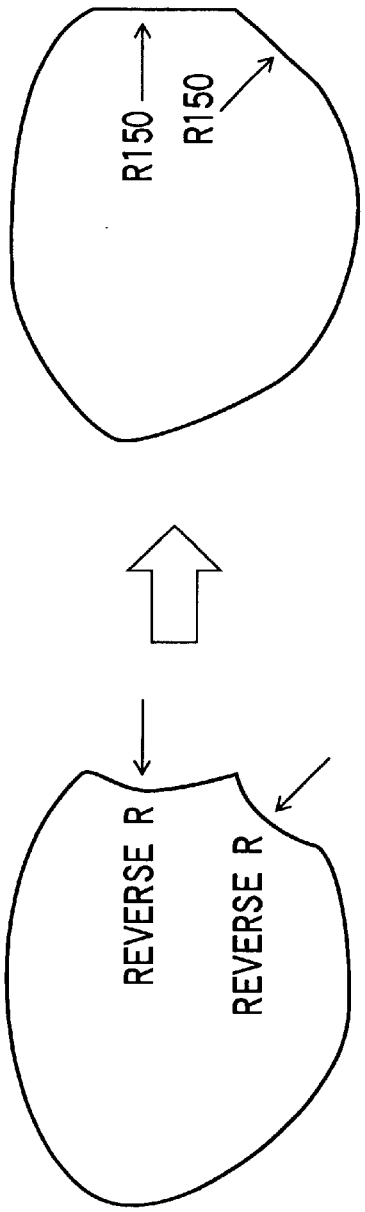
FIG. 20 is a drawing for explaining the examination of lens shape changes in the first embodiment.

FIG. 18 is a flow chart of the method for changing frame type relating to the first embodiment. FIGS. 19 through 24 are figures for explaining how to examine and decide upon changes in the process for changing frame type in the first embodiment. The method for changing frame type, relating to the first embodiment, is explained below with reference to these figures. Moreover, the first embodiment shows an example of the case of changing to a full-rimmed type without changing the design of the three-piece type of frame. Also, this first embodiment shows the method of using computer simulations with the display screen for performing the operation of revising data relating to the three-piece frame, such as lens shape data, and the operation for adding data relating to parts of the full-rimmed type of frame that are not in the three-piece type of frame. This is an example where an image of the eyeglasses worn on the face can be displayed by capturing an image of the eyeglass consumer's face and overlaying the eyeglass frame image generated by the data relating to the abovementioned eyeglass frame on the face image. In the following explanation, the hardware, such as the computer used for the simulation, is the same as the constitution discussed above and an explanation thereof is omitted.

In the flow chart in FIG. 18, data relating to the frame, including the lens shape data for the three-piece frame, is input to the computer (step 301). When data relating to the image of the eyeglass consumer's face is input to the computer using a digital camera or the like, an image is synthesized using the input data and the previously input data relating to the frame. As shown in FIG. 19, an image of a face wearing the three-piece frames is displayed on the display screen.

Next, the screen is changed to a screen showing only the lens shape for the three-piece type of frames; a concave check is performed to check for the presence of concave (step 302). Concave means that the curve marking the outline of the lens perimeter is a curve which is convex towards the center of the lens (concavity in the outer edge of the lens), as shown in the three-piece frame lens shape shown in FIG. 20. In the case of concave, the entire design image changes when corrected to the full-rimed type of shape; the change is therefore not possible (step 310). In other words, in the case of the full-rimmed type of frames (and the case of the semi-rimless type of frames), the shape of the rim at the lens supporting structure cannot be in the concave shape. Even the shape closest to the concave is convex toward the outside with the maximum value of the radius R of that curvature (for example, 150 mm). Consequently, when corrected to the form closest to the concave, this becomes the form shown in FIG. 20 and the image becomes markedly different in design from the case of concave.

When it is confirmed in the abovementioned step 302 that there is no concave, the process advances to the next step 303 and the maximum radius check is performed. When the radius of curvature R of the curve marking the outline of the lens perimeter is too large, the lens cannot be supported by the rim and lens deviation occurs; maximum radius is defined as the maximum radius of curvature R (for example, 150 mm) at which this lens deviation does not occur. When portions of the three-piece frame lens shape exceed the maximum radius (150 mm, for example) in the maximum radius check (for example, when there are portions which are nearly straight lines), the design image changes greatly when those portions are revised to the maximum radius; in this case as well, the change is not possible (step 311).

When there are no portions exceeding maximum radius in the abovementioned step 303, the process advances to the next step 304 and the closing block position is determined. To determine closing block position, a determining closing block shape, formed of the trapezoid shown by the solid lines in FIG. 21(1), is used in order to judge whether the closing block is within a range satisfying conditions of the function and structure, and for manufacturing.

The closing block 321 used for making the decision has the form as shown in FIG. 21(2). A blank with a horizontal width of 5 mm (cut from a deformed wire) is used as the raw material; the approximate form of the closing block is made by cutting the rim mounting side of this blank at an angle to match the form of the rim (edge of lens). The closing block 321 is divided in two, an upper piece 322 and a lower piece 323; the upper piece 322 and lower piece 323 are soldered to the upper and lower rims 324, 324 respectively. A structure wherein the lens is supported by the tension of the rim 324 is created by screwing together the upper piece 322 and lower piece 323 with the screw 326. The closing block 321 is hidden behind the rear of the endpiece 325 so it cannot be seen from the front or side of the eyeglasses.

The length (4.15 mm) of the lower edge (measure line) S1 of the determining closing block form is the sum of the thickness (1.15 mm) of the rim 324, the distance (0.6 mm) from the rim 324 to the screw head of the screw 326, the diameter (1.8 mm) of the screw head, and the distance from the screw head to the end of the closing block. This length of the lower edge S1 is the minimum dimension in which the rim and screw can be structurally established in the closing block. The lower edge S1 and upper edge (measure line) S2 of the determining closing block form are parallel; the distance (height) between the lower edge S1 and upper edge S2, 2.8 mm, is the minimum dimension for ensuring the solder strength and screw holding strength. The end point on the rim mounting side of the lower edge S1 of the determining closing block form is the reference point Al; the end point of the upper edge S2 on the side opposite from the rim mounting side is the reference point A2.

As discussed above, the end surface of the closing block on the rim mounting side is cut to match the form of the rim. However, because the horizontal width of the blank used as the source material to be cut is 5 mm, the upper edge S2 of the determining closing block form is 5 mm maximum. Consequently, the allowable cutting angle on the rim mounting side (angle formed by the lower edge S1 and the end surface of the rim mounting side) is maximized when the upper edge S2 is 5 mm and the maximum angle max becomes 10720. Also, the minimum allowable cutting angle is formed when the upper edge S2 is the shortest distance which still ensures the strength of the screw portion; the minimum angle min becomes 80°. Moreover, the maximum allowable cutting angle max can be increased if the blank size is greater than 5 mm, but the range of possible locations of the closing block can be broadened by using an closing block or determining closing block form which is as small as possible.

Next, the method for finding the closing block cutting angle using the determining closing block form is discussed. As shown in FIG. 23, the measure line (lower edge) S1 of the determining closing block form is laid over the lower edge S3 of the endpiece. The end point (reference point A1) of the measure line S1 on the rim side is matched with the reference point A3 which is the intersection of the lower edge S3 of the endpiece and the inner line of the rim (outline of the inside of the rim). At this time, the intersection C1 of the measure line S2 and the inner line of the rim is found and the measure line S5, which is a line connecting this intersection C1 and the reference point A3, is found. The angle formed by this measure line S5 and the lower edge S3 of the endpiece is the closing block cutting angle. (This measure line S5 is used because the actual inner line of the rim (outline of lens shape) is a curve having various radii of curvature and it is difficult to determine the closing block position relative to the curve; the cutting angle is therefore found using the straight measure line S5.) When this cutting angle is within the range of the allowable closing block cutting angle min to max as shown in FIG. 23, the closing block can be located at the position shown in the figure; the position of the closing block is determined from the endpiece without the closing block extending beyond the outside of the endpiece.

Figure 22:
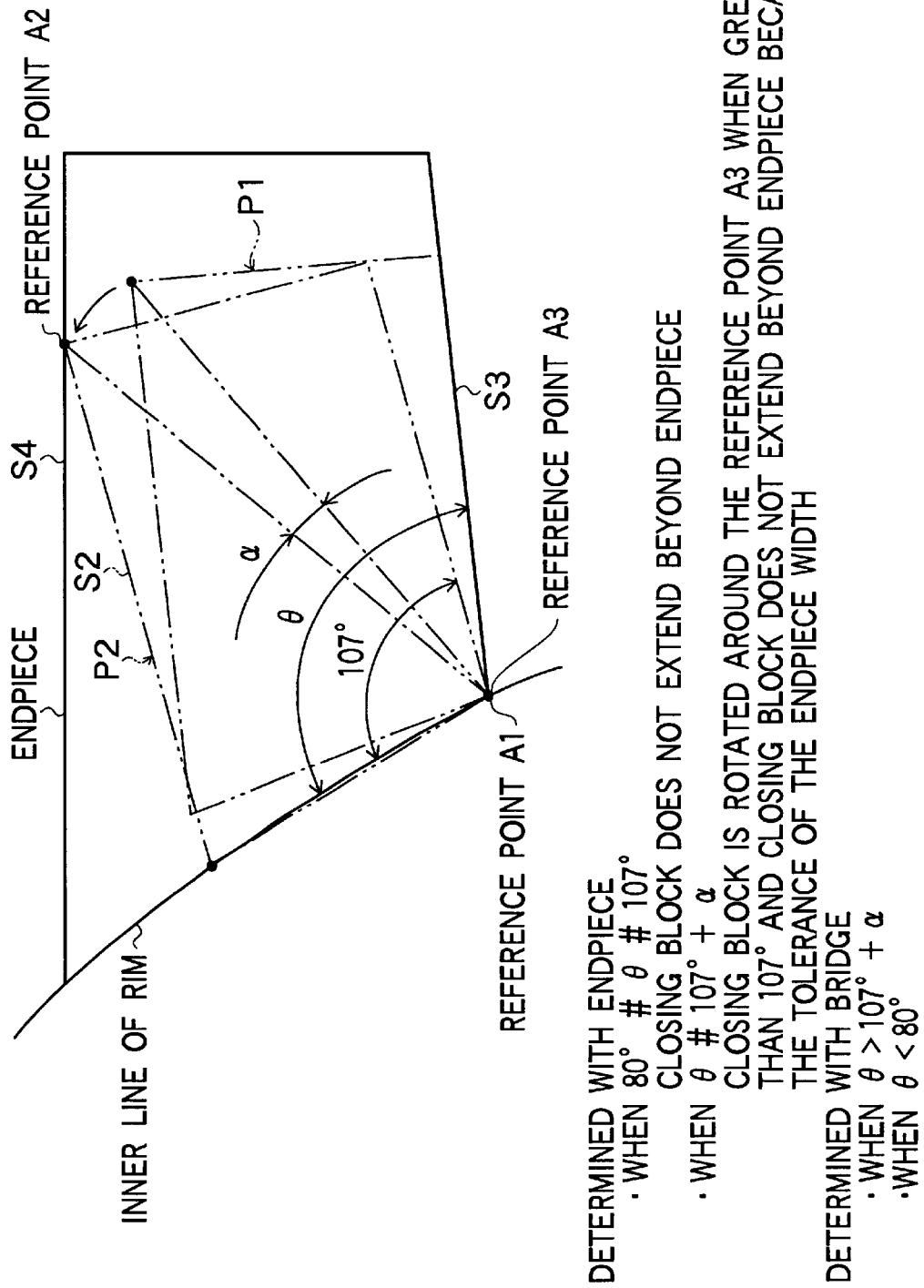
FIG. 22 is a drawing for explaining the determination of the closing block position in the first embodiment.

However, in the case where the closing block cutting angle is greater than the maximum allowable cutting angle max as shown in FIG. 22, the closing block cutting line (cutting surface) cannot be matched to the inner line of the rim, even when the measure line S1 of the determining closing block form is positioned over the lower edge S3 of the endpiece (setting position P1). In this case, the reference point A1 of the determining closing block form is rotated around the reference point A3 to match the closing block cutting line to the inner line of the rim. The range in which this type of rotation is possible is as shown in FIG. 22. The determining closing block form is rotated by angle to the rotation position (setting position) P2 where the reference point A2 matches the upper edge S4 of the endpiece. If rotated further, the closing block extends beyond the endpiece. Consequently, when the cutting angle is greater than 107°+ or when is less than 80°, the closing block cannot be established on the endpiece side; the setting position for the closing block is established on the bridge side (nose side). Moreover, in FIGS. 22 and 23, the lower edge S3 and upper edge S4, which are the outer lines of the endpiece shown with straight lines, represent the minimum shape which can effectively hid the closing block. In an actual endpiece, a curved ornament or the like is sometimes formed further to the outside of the edges S3, S4.

When the closing block position is determined in the abovementioned step 304, the process advances to step 305 and an radius check for the closing block position is performed. This radius check for the closing block position determines whether the radius R of the rim curvature at the position where the closing block is mounted is greater than the minimum radius R of curvature (minimum R value) allowable in the closing block cutting work; this radius check also determines the working tools used and the working conditions. The process advances to step 307 if it is determined that the R value is greater than the minimum allowable radius of curvature for the closing block cutting work.

When it is determined that the R value is less than the minimum allowable radius of curvature for the closing block cutting work in the abovementioned step 305, the radius of curvature of the closing block mounting position is corrected to the minimum allowable radius of curvature for the closing block cutting work (minimum R value) in step 306 and the process advances to step 307.

Figure 24:
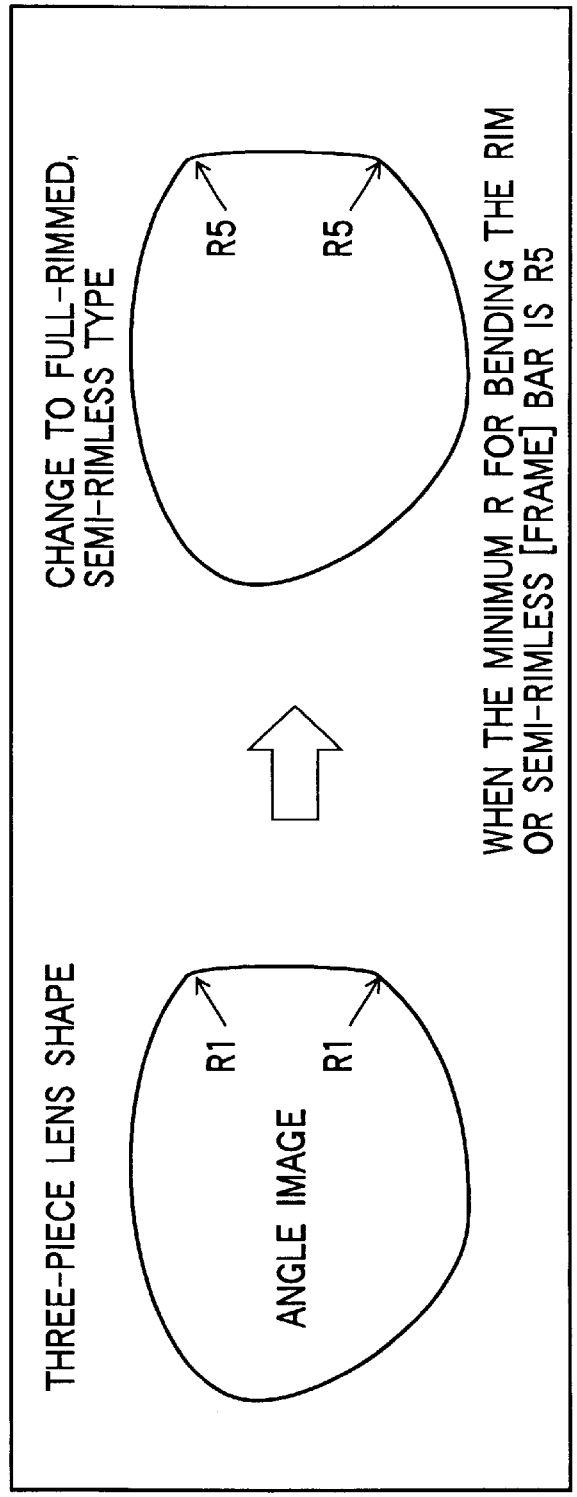
FIG. 24 is a drawing for explaining the examination of lens shape changes in the first embodiment.

In step 307, a minimum radius check is performed. The rim is formed from rim wound in a specified form by a rim winder. At that time, the rim is wound by a cam provided in the rim winder; the radius R of curvature of the rim, for manufacturing, is not attained if the minimum R value is less than the radius of curvature of that cam. Consequently, in the present embodiment, the minimum radius of curvature to allow manufacturing is the minimum radius. When the three-piece frame lens shape has portions less than the minimum radius (5 mm, for example) (such as when portions are nearly at right angles) in the minimum radius check, the process advances to step 308 and those portions are corrected to the minimum radius. As shown in FIG. 24, the design image does not change significantly in this case even when the revisions are made, therefore the revisions are possible. When this step 308 is complete or the minimum radius check is passed in step 307, the process advances to step 309, data for a full-rimmed frame having the same design image as that of the three-piece frame before the changes is attained, and the changes to the frame type are complete.

The abovementioned first embodiment makes it possible to change the frame type with relative simplicity without changing the design image, by following prescribed procedures, while using the data relating to the frames before the changes. If this method is performed using a simulation apparatus comprising a personal computer established at the point of purchase, it becomes possible to order types of frames with design images other than those displayed at the eyeglass shop; this makes it possible to meet more diverse needs.

Figure 25:
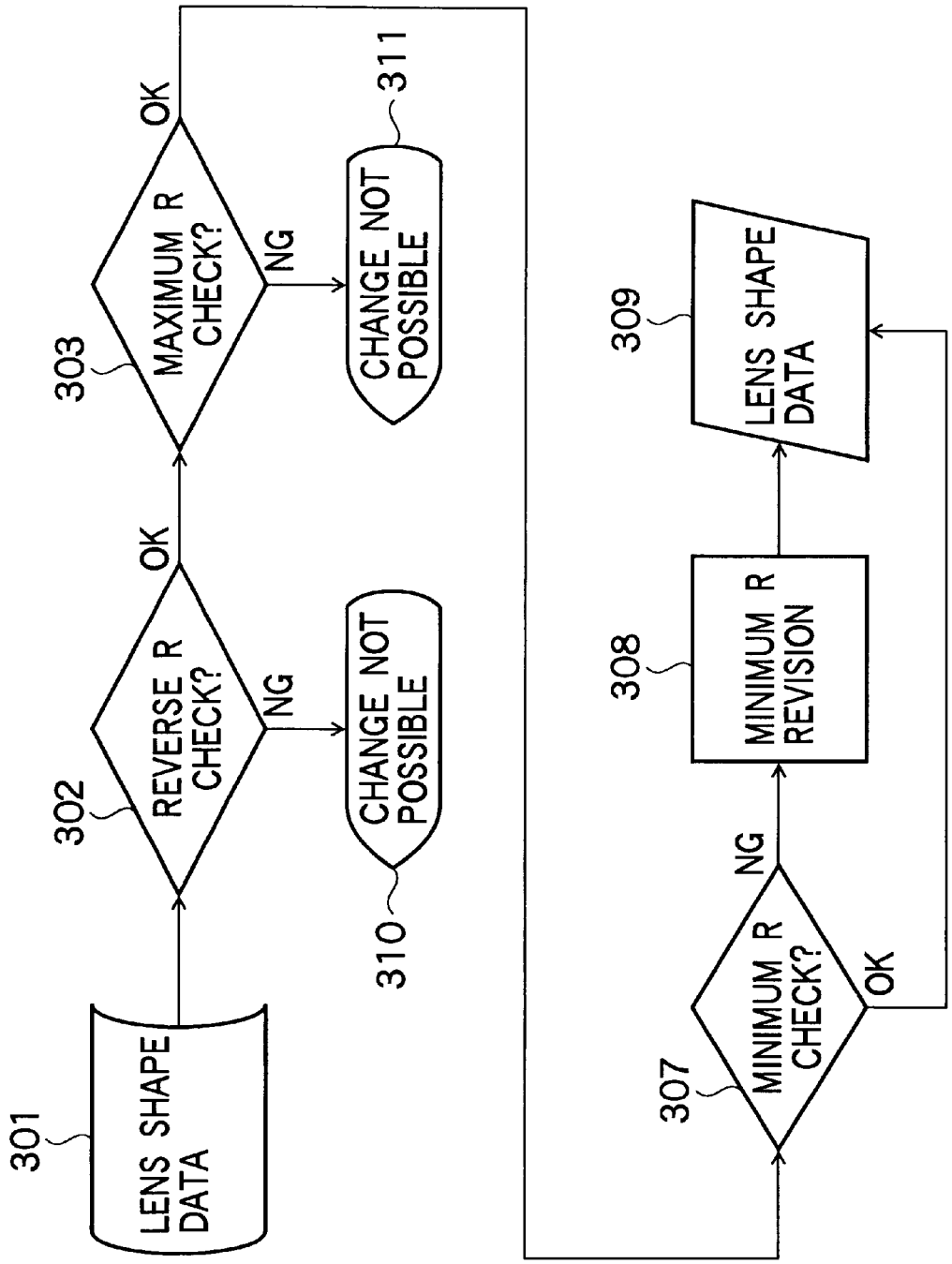
FIG. 25 is a flow chart of the method for changing frame type in the second embodiment.

FIG. 25 is a flow chart showing the method for changing frame type relating to the second embodiment. This second embodiment shows an example of changing from a three-piece type to a semi-rimless type. The process flow is entirely the same as the process flow in the first embodiment shown in FIG. 18, except for the steps relating to the closing block, because there is no closing block in the case of the semi-rimless type of frames. Consequently, the same step numbers are used for the steps in the flow chart for the second embodiment in FIG. 25 which are the same as those in the first embodiment and an explanation thereof is omitted.

Figure 26:
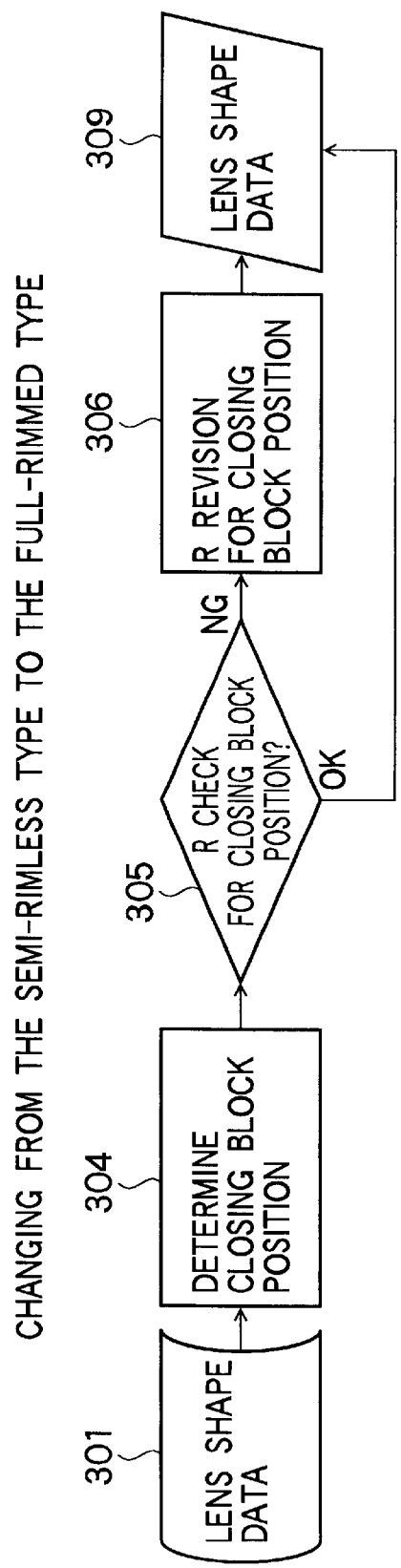
FIG. 26 is a flow chart of the method for changing frame type in the third embodiment.

FIG. 26 is a flow chart showing the method for changing frame type relating to the third embodiment. This embodiment is an example of changing from the semi-rimless type to the full-rimmed type. The process flow is exactly the same as that of the first embodiment in FIG. 18, except for the steps relating to concave and minimum radius, because the semi-rimless type has no concave or smallest radius and it is not necessary to determine these. Consequently, the same step numbers are used for the steps in the flow chart for the third embodiment in FIG. 26 which are the same as those in the first embodiment and an explanation thereof is omitted.

As discussed above, the limitations (concave, minimum radius, maximum radius closing block position, etc.) in the case of changing eyeglass frame type are based on differences in the method for installing the lenses. These limitations increase in order from the three-piece type, semi-rimless type, and full-rimmed type. There are other modes of changes than those in the abovementioned first through third embodiments, but changes from a type with many limitations to a type with few limitations can be made without many alterations relating to the lens form. For example, the three-piece type has a structure wherein holes are made in the lenses and the bridge and endpieces are affixed with screws. There are therefore no limitations to the lens form and no limitations two switching from other frame types to the three-piece type of frames.

Also, when the operator changes the eyeglass frame type, it is necessary to design parts which were not present in the eyeglass frames before the changes. The parts constituting the full-rimmed type, semi-rimless type, and three-piece type of frames can be divided into parts which are present in all three types and parts which are present in only one type. The standard parts common to the three types include lenses, bridge, pad arms, pads, endpieces, hinge, hinge screw, temples, and temple covers. The parts peculiar to the different types include the rim, closing block, closing block screw for the full-rimmed type; semi-rimless frame bar, nylon cushion, and nylon thread for the semi-rimless type; and bridge side lens fixing tooth, bridge side lens fixing screw, endpiece side lens fixing tooth, and endpiece side lens fixing screw.

The common parts form the basis for the image of the eyeglass frames; therefore, the form, mounting position, and so forth of the common parts are changed as little as possible when the eyeglass frame type is changed.

For the characteristic parts, it is necessary to make a design, and so forth, for newly occurring characteristic parts, while considering the method for changing part locations in step 54 discussed below. Specifically, designs relating to the semi-rimless type bar are made when changing from the full-rimmed or three-piece type to the semi-rimless type. Also, designs relating to the bridge side lens fixing tooth, endpiece side lens fixing tooth, and lens fixing screw are made when changing from the full-rimmed or semi-rimless type to the three-piece type. Also, designs relating to the rim, closing block, and closing block screw are made when changing from the three-piece or semi-rimless type to the full-rimmed type.

Next, step 51 in the trial step in FIG. 1 is the step for inputting the lens shape. This step 51 is performed in the case where the operator wants to change the lens shape of the basic frame selected in step 2. For example, the lens shape for the frame with the basic design selected in step 2 is changed when the consumer does not like that frame as displayed in use on the screen in the overlap step. Different modes for making the change are prepared: mode of selecting from original lens shapes, mode of selecting from manufacturer's part numbers, mode of selecting from lens shapes measured using the lens shape measuring instrument (three-dimensional frame tracer) 103, and mode of selecting from recommended lens shapes. The customer or operator can select his/her preferred lens shape freely from a wide range of lens shapes, from those reflecting his/her own design to those recommended by a specialist.

Step 52 is the lens shape revision step for revising the size or partial design of the lens shape. In this step 52, the operator maintains the basic design of the frames selected in step 2, while uniformly enlarging or reducing the lenses, changing the horizontal width (A size) and/or vertical width (B size) of the lenses, revising the irregularity of the lens shape, or changes the curvature between three points established in part of the curve outlining the lens shape (three point arc insertion).

Step 53 is the step for changing the types of parts used as standard in the frame with the basic design selected in step 2. These changes can be made for all parts of the eyeglasses, such as the bridge, endpieces, temple, pads, end covers, ornamentation, jewels, and so forth.

Step 54 is the step for changing the positions of the parts. Because the impression or A look@ differs according to the part positions, it is possible to change the positions of the entire front, and the bridge, endpieces, and temples. These changes are necessarily limited by the structure and dimensions; the allowable range, and so forth, is determined and displayed.

Next, the method for determining endpiece and bridge positions for the eyeglasses used in step 54 for changing the positions of the abovementioned parts is explained in detail using FIGS. 27 through 35. This method for determining endpiece and bridge positions for the eyeglasses allows the operator to move the positions of the endpieces and bridge on the eyeglass frames on screen and determine the positions of the endpieces and bridge to suit the consumer's preferences. Moreover, the method for determining endpiece and bridge positions for the eyeglasses explained using FIGS. 27 through 35 can be applied to the generation of usual eyeglass designs, as well as to the eyeglasses made-to-order system in the present embodiment.

FIGS. 27 through 35 are figures for explaining the confirmation of design image changed by the movement of the pieces and the determination of whether movement is possible when performing the method for determining endpiece and bridge positions for the eyeglasses. Below, the method for determining endpiece and bridge positions for the eyeglasses is explained with reference to these figures. In the following explanation, the hardware such as the computer comprising the computer graphics apparatus is the same as in the abovementioned constitution and an explanation thereof is omitted.

Figure 28:
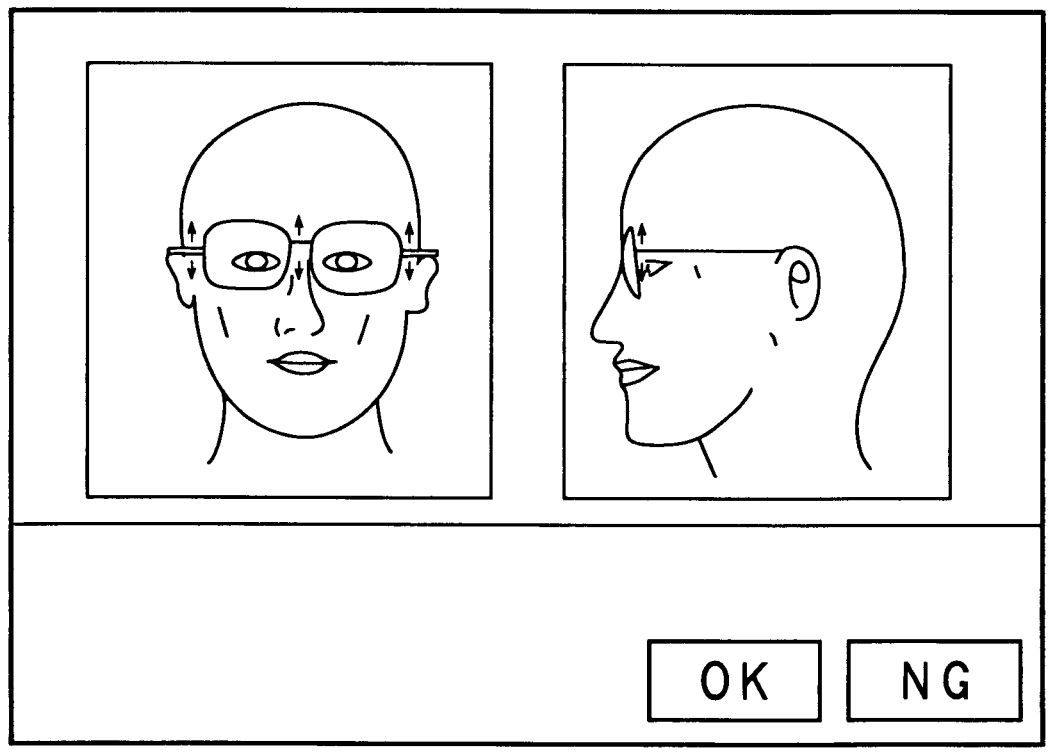
FIG. 28 shows an example of the computer graphics screen when carrying out the method for determining the positions of the eyeglass endpieces and bridge relating to the embodiments of the present invention.

Data relating to the frames, including lens shape data for the eyeglass frames selected by the consumer, are input to the computer. The facial image of the consumer is input to the computer using a digital camera or the like. Thereupon the image of the face wearing the eyeglasses is displayed on the screen as shown in FIG. 28. This screen provides a simulation of the consumer actually wearing the eyeglasses. In this situation, it is judged whether it is necessary to move the positions of the endpieces and bridge. When movement is thought to be necessary, the operator moves the positions of the endpieces and bridge while looking at the screen, confirms the change to the image of the consumer's face for each position, and determines the positions of the endpieces and bridge which the consumer thinks best. The movement of the endpiece and bridge positions may be performed with a separate screen showing the eyeglass frames as shown in FIG. 27; the mounting positions of the endpieces 401 and bridge 402 are changed with respect to the rim 403 on screen and the preferred positions determined.

The means and method for moving the endpieces and bridge on screen may include a method for inputting the amount of movement and range of movement using a keyboard, or a method for selecting and dragging the endpieces and bridge with a cursor, or the like, using a mouse, or the like. In the case of moving the bridge with a dragging method, the movement may be limited to vertical movement only because the symmetry of the front portion of the eyeglasses may be lost due to horizontal movement when the endpieces and bridge can be freely moved both horizontally and vertically. Also, because symmetry is lost if the endpieces on the right and left are moved separately, the endpieces on either side may be linked together and moved so as to be placed in symmetrical positions. The endpiece and bridge positions may be moved continuously or in stages, and can preferably be stopped at any position during movement.

The endpieces 401 and bridge 402 shown in FIG. 27(1) are parts which are actually stocked, but with slightly longer dimensions. In FIG. 27, while the forms of the stocked parts are displayed on screen individually and independently; identical parts can be moved with respect to the rim and their positions determined. FIG. 27(2) shows the state where the endpieces 401 and bridge 402 are in standard positions relative to the rims 403. FIG. 27(3) shows the state where the endpieces 401 and bridge 402 are at the topmost allowable positions. In FIG. 27, the shaded portions on the endpieces and bridge are extra portions; these are removed on screen by the imaging process and are removed by cutting during manufacturing.

After the positions are determined, the numerical information of the endpiece and bridge positions is output and manufacturing drawings and data for numerical control millimg machines are generated. With the generated data, parts in stock undergo numerical control milling to match the lens shapes, being the mounting portions therefore, and are assembled according to the drawings; eyeglasses with the optimum endpiece and bridge positions according to the consumer's preferences can thereby be produced. Moreover, it is also possible to determine the positions without considering these stocked parts. In that case, however, the parts are produced once the positions are determined. In such a case, the costs for one-off production become high, the manufacturing process takes more time, and the delivery date becomes further off.

As shown in FIG. 29, two or more part types with different lengths are prepared as parts in stock. The part with the optimum length, according to the installed position, may be selected and finished. In this case, because the parts can be mass produced, the manufacturing costs for the parts can be reduced and the time to delivery decreased; however, the amount of parts in stock increases.

Figure 30:
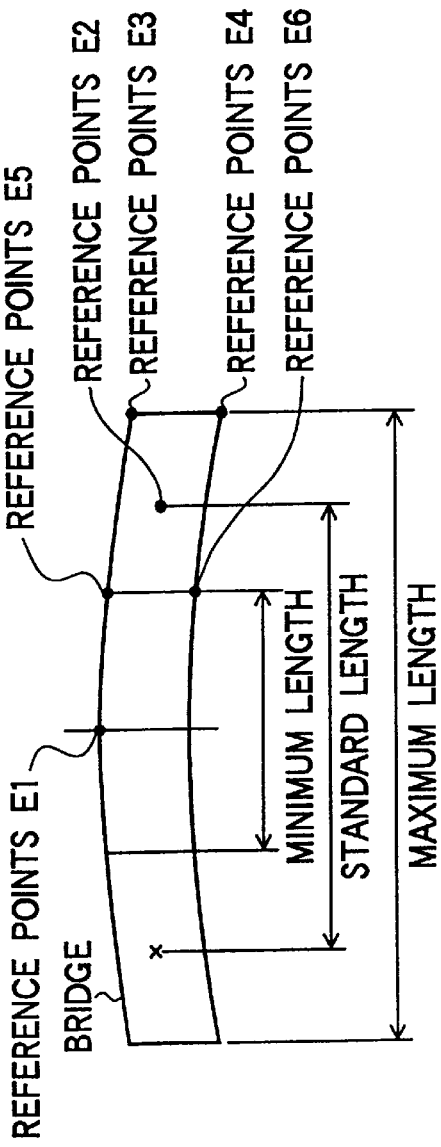
FIG. 30 is a drawing to explain the method for determining the positions to which the bridge can be moved in the embodiments of the present invention.

Furthermore, as shown in FIG. 30, the range of lengths of a part such as the bridge may be limited and the range of movement limited within a range established within those limits. In other words, parts with one or two or more ranges of lengths are in stock; the range of movement of the endpieces and bridge is limited to the ranges in which those parts can be manufactured.

Moreover, it is natural to assume that the range in which the endpieces and bridge can be moved is limited by the range of positions at which the endpieces and bridge can be mounted on the lens fixing elements (rim, semi-rimless frame bar, or lens fixing teeth, etc.). Consequently, movement outside of this range is limited so as to be impossible.

Next, the method for determining the range of movement of the endpieces and bridge is discussed. The reference points for determining the range of bridge movement are established as shown in FIG. 30. The reference point E1 is the point from which the upper and lower limit positions of the bridge are measured and is established at the topmost position on the bridge. Also the reference point E2 is the point showing the standard length of the bridge. The reference points E3 and E4 are point showing the maximum length of the bridge; the reference point E3 is the upper point of the maximum length and the reference point E4 is the lowest point of the maximum length. The reference points E5 and E6 are point showing the minimum length to which the bridge can be shortened; the reference point E5 is the upper point of the maximum length and the reference point E6 is the lowest point of the maximum length.

Figure 31:
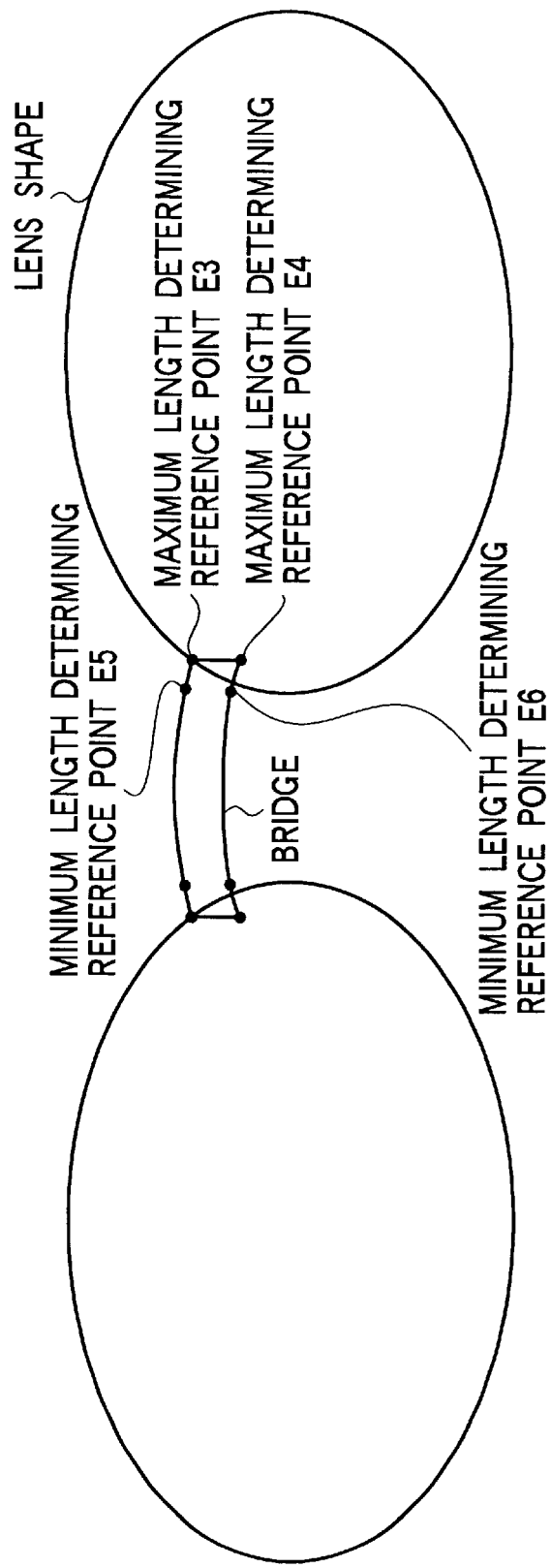
FIG. 31 is a drawing to explain the method for determining the positions to which the bridge can be moved in the embodiments of the present invention.
Figure 33:
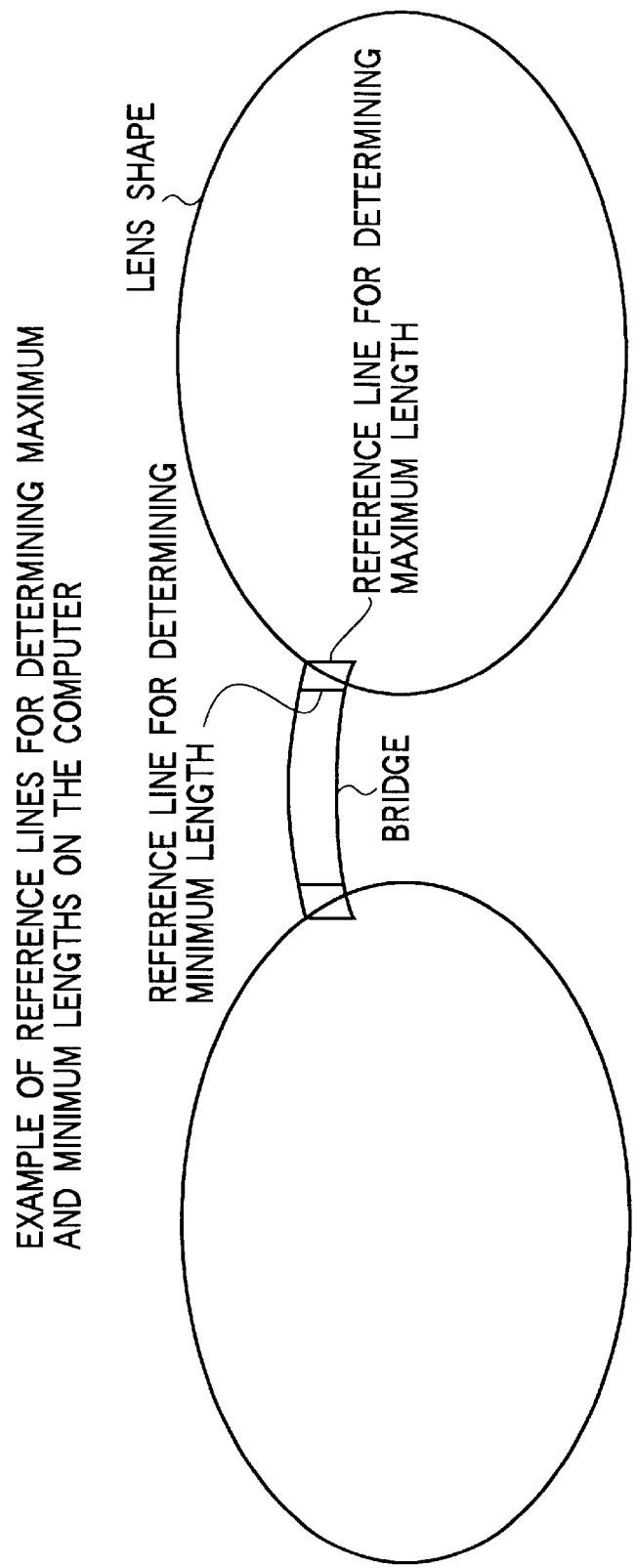
FIG. 33 is a drawing to explain the method for determining the positions to which the bridge can be moved in the embodiments of the present invention.

As shown in FIG. 31, the range in which the bridge can be moved is determined according to the relative positions of the reference points E3 to E6 and the lens shape. In other words, when the maximum length reference points E3 and E4 are located within the lens shape or on the outline thereof and the minimum length reference points E5 and E6 are located to the outside of the lens shape or on the outline thereof, then the bridge is judged to be at a position where movement is possible. The bridge position in FIG. 31 is the position for a bridge of maximum length. Moreover, FIG. 33 shows an example where the maximum and minimum lengths of the bridge are determined with a reference line rather than the reference points. The bridge is judged to be at a position where movement is possible when the reference line for determining maximum length is within the lens shape or on the outline thereof or the reference line for determining minimum length is outside the lens shape or on the outline thereof. Movement is more strictly limited by making the decision using the reference line. Moreover, in order to make these decisions on the computer, the lens shape, bridge shape (and endpiece shape), and the reference points and reference lines for the maximum and minimum lengths of the bridge (and endpieces) are input in advance to the computer storage device.

FIG. 29 shows the case of using a plurality of bridges with different lengths but similar shapes, so that the design image remains the same. FIG. 29(1) is an example of three bridges 411, 412, 413. The bridge 411 can be mounted at the position L1 on the lens shape outline; the bridge 412 can be mounted at the position L2 on the lens shape outline; and the bridge 413 can be mounted at the position L3 on the lens shape outline. The range of bridge movement can be broadened by using the three bridges with different lengths 411, 412, 413. As shown in FIG. 29(2), when the bridge is lowered vertically toward the lens shape, it is determined the bridge can be mounted if the length L of the line between the two points, at which the reference points E3 and E6 of the bridge meet the outline of the lens shape, is greater than the length B between the reference point E3 and reference point E6. When the length L is shorter than the length B, the minimum length reference point E6 falls within the lens shape and the maximum length reference point E3 extends beyond the lens shape as shown in FIG. 29(3).

FIG. 32 is a figure for explaining how to determine the range of endpiece overhang. The minimum length points D2 and D3 are reference points for the shortest length of the is endpiece; the maximum length points D4 and D5 are reference points for the greatest length of the endpiece. Like the case of the bridge discussed above, this is determined to be a mountable position if the minimum length points D2 and D3 are outside of the lens shape or on the outline thereof and the maximum length points D4 and D5 are within the lens shape or on the outline thereof. Moreover, the minimum length point D3 is supplemental, in that it regulates that a pattern or the like is not cut, in the case where the endpiece cannot be cut because of a pattern. Consequently, when there is no pattern or the like, the minimum length may be determined with only the minimum length point D2. FIG. 32(1) shows the case where endpiece overhang is minimized at heights H1 and H2; FIG. 32(1) sic shows the case of maximum endpiece overhang, relative to FIG. 32(1). The amount of endpiece overhang is adjusted at a 0.5 mm pitch, for example; the range of the amount of overhang, in which movement from the current endpiece position is possible, is displayed on the screen. The operator can freely move the endpiece on the screen by inputting the desired amount of overhang within that range.

Sometimes the endpieces and bridge include patterns and designed differences in level patterned edges; if those portions are cut away, the original image may become completely different. In that case, the positions to which the endpieces and bridge may be moved are limited so that the portions with the pattern or differences in level are not cut. FIG. 34 shows an example of a bridge with different levels. The bridge 410 with protruding levels in FIG. 34(1) displays the different levels at the standard position in FIG. 34(2). But if moved downwards as shown in FIG. 34 (2), the width of the bridge 410 is decreased, the differences in level disappear, and the image changes. FIG. 35 shows an example of a patterned bridge. The patterned bridge 420 in FIG. 35(1) displays patterned and unpatterned portions at the standard position in FIG. 35(2). But when moved downwards as in FIG. 35(3), the width of the bridge 410 sic is decreased, only the patterned portion remains, and the image changes.

In addition, the closing block is hidden behind the endpiece in the case of full-rimmed eyeglass frames. In such a case, the minimum length of the endpiece is the minimum dimension which can enclose the closing block.

With the embodiments discussed above, the positions of the eyeglass endpieces and bridge can be determined according to the consumer's preferences and the eyeglass design can better reflect the consumer's preferences.

Next, step 55, in the trial step in FIG. 1, is the step for changing the eye size, distance between lenses (DBL) or temple length.

Step 56 is the step for changing the colors of eyeglass parts such as the bridge, endpieces, temples, pads, and end covers. This can be can be made for all parts at once or the parts can be changed individually.

Step 57 is the step for changing the lens color; a preferred color can be selected.

Step 58 is the step for changing the usage scene. The usage scene is the background screen of the portrait; various backgrounds such as an office, wedding, or resort can be selected.

Step 59 is the step for inputting the lens prescription. This step is necessary to this embodiment and is performed after the comparing/examining step, if not performed during the trial. Also, when this system is used to select frames only, the lens prescription is not necessary, and in that case, dummy data are input in the prescription input step.

In the abovementioned trial steps, various changes are made to the frames with the basic design, one or two or more preferred frames are determined, and the process advances to the next comparing/examining step (step 6). In this comparing/examining step, the frames to be ordered are decided upon. When a decision cannot be made, the process returns to step 5 for another trial.

In the case where a decision is made in the comparing/examining step (step 6), it is determined in the next step (step 7) whether the lens prescription was input. When the prescription has not been input, the prescription is input. When the prescription has been input already, the process advances to the next step 8.

In step 8, it is found whether the facial measurements have been made. When measurements are to be made, the numerical values for each of the frame parts are measured and input using the facial measuring instrument 104 (step 81). Meanwhile, when facial measurements are not made (for example, when there are no special eyeglass specifications (when no major alterations are made to the basic design of the frames), when it is decided that the consumer is not in the specific wearing environment, or when it is thought that slight fitting operations after the eyeglasses will be sufficient), the process advances to step 9, the temple lengths are input, and other specifications are attained from the two-dimensional screen. When step 9 is complete, data necessary for manufacturing the eyeglasses, including the form of the frames determined in the abovementioned steps, are transmitted to the host computer 110 via telecommunications lines.

The host computer 110 has an order check database containing data including the data necessary for manufacturing the eyeglasses. The host computer analyzes the data transferred from the abovementioned point-of-purchase interactive system 100 and decides whether manufacturing is possible. If manufacturing is not possible, the host computer sends a response to that effect to the point-of-purchase interactive system 100 and if manufacturing is possible, advances to the next step (step 10).

In the case where the point-of-purchase interactive system 100 receives the response that manufacturing is not possible, the process returns to the trial step 5 and goes through the steps, such as making changes, once more. Meanwhile, when it is determined that manufacturing is possible, the process advances to step 11; the dimensions of each part are calculated, as well as the price and delivery date and those results are returned to the point-of-purchase interactive system 100 (step 12). When the price is calculated, the type of each part, materials, grade, dimensions, weight, and milling costs are considered and prescribed calculation rules are followed.

In the point-of-purchase interactive system 100, it is decided whether to make the order once the responses about price and delivery data are received from the abovementioned host computer 110 (step 13). When it is decided not to place the order, that information is input, and the process returns to the trial step 5. When it is decided to place the order, that information is input, and the response is sent to the host computer 110.

When the host computer 110 receives the response that the order is to be made, the process advances to step 14. The order processing database, having data including the data processing necessary for manufacturing the eyeglasses and the instruction processing necessary for manufacturing the eyeglasses stored in the host computer 110, is operated and the data necessary for manufacturing the eyeglasses are generated. The frame manufacturing instructions and manufacturing data are transmitted to the terminal 121 in the manufacturing plant responsible for producing the frames; the lens manufacturing instructions and manufacturing data are transferred to the terminal 122 in the manufacturing plant responsible for manufacturing the lenses (step 14).

At each manufacturing plant, these data are output (steps 151, 152) and the frames (step 153) and lenses (step 154) are manufactured. Then these are sent to the eyeglasses assembly plant where the eyeglasses are assembled (step 16); the eyeglasses are shipped out after inspection (step 17).

With the eyeglasses made-to-order system according to the embodiments discussed in detail above, any of a plurality of basic frames prepared in advance is selected on the display screen and an operator can arbitrarily select only those trial steps believed necessary for the selected basic frames. As a result, the main processes for the eyeglass design decisions can be performed according to procedures freely selected by the operator, and not procedures determined in advance by computer software. Accordingly, this can markedly increase the possibility of design decisions more directly reflecting the operator's or consumer's sensibility. Moreover, the main procedures can be determined according to the free will of the operator or consumer; therefore, only the steps thought necessary by the operator are performed and quick processing becomes possible. Furthermore, because this is a system where only the necessary steps are performed, rather than a system for mechanically performing all the main steps, the total processing time is not immediately lengthened even if plenty of functions are given to each step. As a result, it becomes easy to fulfill each of the functions. In addition, the concept of this system is applied to each function itself and only the necessary steps are performed; the functions are completed accordingly and quick and appropriate processing becomes possible. Also, even if new principal steps are added, it is not necessary to change the entire system; another advantage, therefore, is that system upgrades are very easy.

INDUSTRIAL APPLICABILITY

The present invention relates to an eyeglasses made-to order system wherein any of a plurality of basic frames prepared in advance is selected on the computer-controlled display screen and eyeglass specifications which optimally reflect the consumer's preferences can be determined and ordered by arbitrarily changing the various structural members of the eyeglasses, including the various frame types, lens shapes, and parts, based on the frames with the selected basic design. With the present invention, an eyeglass design which stresses the consumer's preferences can be quickly determined and ordered using only the procedures thought necessary by the operator.

What is claimed is:

1. An eyeglasses made-to-order system wherein an operator uses an interactive system using means including a computer-controlled display screen to determine eyeglass specifications necessary for ordering eyeglasses, including necessary items relating to each structural member of the eyeglasses;

wherein any of a plurality of types of basic frame designs prepared in advance is selected from said display screen; and the optimum eyeglass specifications, reflecting the consumer's preferences, can be determined on and ordered from the display screen, by any changes to the structural members of the eyeglasses, including frame type, lens shape, and parts, based on the selected basic frame design.

2. An eyeglasses made-to-order system wherein an operator determines eyeglass specifications necessary for ordering eyeglasses, including necessary items relating to each structural member of the eyeglasses, with an interactive system using means including a computer-controlled display screen, and comprising:

basic design selecting function for selecting from the display screen any of a plurality of basic frame designs prepared in advance;

portrait capturing function for taking the portrait of the eyeglasses consumer;

synthetic image generating function for overlaying the image of the selected frames on the portrait taken by said portrait capturing function and displaying a portrait wearing the eyeglasses on said display screen;

one or more changing functions for changing, revising, or inputting necessary items on the display screen, relating to each of the plurality of structural members of the eyeglasses, including the frame type, lens shape, and parts, based on the basic frame design selected using said basic design selecting function;

storing function for storing data including one or more images of the eyeglasses attained on the display screen; and comparing/examining function for comparing or examining the one or more eyeglass images, including the eyeglass images stored in said storing means, displayed on the display screen, deciding upon one of those, or returning to the step for performing said changing function;

wherein the operator performs only those procedures or function changes thought necessary after selecting the basic frame design, makes the best use of the eyeglass consumer's free will, and quickly and accurately performs the ordering operation because after selecting the basic frame design using said basic design selecting function, the operator can arbitrarily select and perform any one or more of the functions: said portrait capturing function, said synthetic image generating function, said one or more changing functions, or said comparing/ examining function.

3. The eyeglasses made-to-order system, according to claim 2, wherein said synthetic image generating function comprises the function of laying the profile image of the selected frames over the profile image of the eyeglass consumer's face captured with said portrait capturing function, as well as the function of laying the frontal image of the selected frames over the frontal image of the eyeglass consumer's face captured with said portrait capturing function.

4. The eyeglasses made-to-order system, according to claim 2, wherein said one or more changing functions include one or more of the following: frame type changing function, lens shape replacing function, lens shape revising function, part changing function, part position changing function, size changing function for changing sizes such as eye size and the distance between lenses, color changing function for changing the colors of the parts constituting the frames, lens color changing function, usage scene changing function for changing the background for lens usage, and lens prescription inputting function.

5. The eyeglasses made-to-order system, according to claim 2, comprising the function of taking facial measurements of said eyeglass consumer, adding those measured values, and revising the eyeglass specifications.

6. The eyeglasses made-to-order system, according to claim 2, comprising an order check access function for accessing the order check database comprising data including data necessary for manufacturing the eyeglasses, after said eyeglass specifications are determined, and attaining information necessary when ordering eyeglasses, including whether it is possible to manufacturing eyeglasses to those specifications, price, or delivery date.

7. The eyeglasses made-to-order system, according to claim 6, comprising an order access function for accessing an order acceptance database, comprising data including order acceptance processing, processing of data necessary for manufacturing the ordered eyeglasses, and processing of instructions necessary for manufacturing the eyeglasses, and completing the order after said order check access function is performed and the order determined.

8. A method for generating synthetic images for an apparatus to simulate eyeglass wearing by capturing a frontal portrait image of a person's face on a computer-controlled display screen using an imaging function, laying a frontal image of frames of eyeglasses over the portrait image, and displaying a portrait image wearing said eyeglasses;

wherein symmetry of a frontal portrait of said person's face is detected based on the portrait image captured on said display screen, reference points on said portrait image captured on said display screen are determined based on the detected outputs, and said frame image is laid over said portrait image so that reference points on said frame image match the reference points on said portrait image.

9. The method for generating synthetic images for an apparatus to simulate eyeglass wearing, according to claim 8, wherein, in the case that the symmetry of the frontal portrait of said person's face is detected, the symmetry is detected by measuring on said display screen a left corneal vertex distance which represents a distance from a bridge of a nose to a corneal vertex of a left eye and a right corneal vertex distance which represents a distance from the bridge of the nose to a corneal vertex of a right eye, on said portrait image captured by this display screen; and in the case that the reference points for said portrait image captured on said display screen are determined, a point at which a line segment connecting the vertexes of the both eyes on the portrait image is divided according to a ratio between the measured value of said left corneal vertex distance and the measured value of said right corneal vertex distance is obtained and the dividing point is defined as the reference points for said portrait image.

10. The method for generating synthetic images for an apparatus to simulate eyeglass wearing, according to claim 8, wherein said frame image is enlarged or reduced relative to said portrait image or said portrait image is enlarged or reduced relative to said frame image, according to a ratio between a measured value of a distance of corneal vertexes of both eyes of said person and a measured value of a distance to corneal vertexes of both eyes of said portrait image captured on said display screen.

11. The method for generating synthetic images for an apparatus to simulate eyeglass wearing, according to claim 8, wherein a posture of said portrait image is automatically corrected by rotation of the portrait image so that a line segment connecting corneal vertexes of both eyes of said portrait image captured on said display screen becomes horizontal.

12. The method for generating synthetic images for an apparatus to simulate eyeglass wearing, according to claim 11, wherein the posture of said portrait image is revised manually after said automatic correction.

13. A method for generating synthetic images for an apparatus to simulate eyeglass wearing, comprising the steps of capturing a profile portrait image of a person's face on a computer-controlled display screen using an image pickup function, determining reference points from this facial profile portrait image, and laying a profile image of eyeglass frames over said facial profile portrait image based on the reference points.

14. The method for generating synthetic images for an apparatus to simulate eyeglass wearing, according to claim 13, wherein eye points are found at a position of a prescribed distance to a front of corneal vertexes in the facial profile portrait image, and a profile image of eyeglass lenses is laid based on the eye points, as well as a profile image of eyeglass frames is laid over the lens image.

15. A method for determining the positions of the endpiece and bridge of the eyeglasses wherein the facial image data of the eyeglass consumer and the form data for the selected eyeglass frames are captured and displayed on screen using a computer graphics method, and the positions of the endpiece and bridge on said selected eyeglass frames can be moved on screen, allowing the selection and determination of the positions for said endpiece and bridge preferred by the eyeglass consumer.

16. The method for determining the positions of the endpiece and bridge of the eyeglasses, according to claim 15, wherein the range of movement for said endpiece and bridge is determined from limits of the design or of the function and structure.

17. The method for determining the positions of the endpiece and bridge of the eyeglasses, according to claim 15, wherein the movements of said endpiece and bridge to be moved are linked together.

18. The method for determining the positions of the endpiece and bridge of the eyeglasses, according to claim 15, wherein the direction in which said endpiece are moved is limited to a horizontal direction and so that the amounts of movement become the same but in mutually opposite directions for the right eye and the left eye.

19. The method for determining the positions of the endpiece and bridge of the eyeglasses, according to claim 15, wherein the direction in which said bridge is moved is limited to a vertical direction.

20. A method for changing the type of eyeglass frames for changing the frame type without changing the design image, wherein data relating to the frames, including the frame form for second eyeglass frames related to a second frame type having a design image in common with the design image of first eyeglasses, are attained by the steps of:

performing data revision operations, to add the minimum necessary revisions required to satisfy the limiting conditions including limitations of the structure or design of a second frame type, while performing data addition operations, to add data relating to parts which are present in the second frame type but not in said first frame type, to data relating to the frames, including the frame shape for first eyeglass frames affiliated with a first type of frames having a specific design.

21. The method for changing the type of eyeglass frames, according to claim 20, wherein said data revision operations for changing from said first type of rimless eyeglass frames to said second type of full-rimmed eyeglass frames include:

concave check, maximum radius check, and determining closing block position;

closing block position radius check and the radius revision for the closing block position performed when that R value is below a certain value; and minimum radius check and minimum radius revision performed when that minimum R value is below a certain value.

22. The method for changing the type of eyeglass frames, according to claim 20, wherein said data revision operations for changing from said first type of rimless eyeglass frames to said second type of semi-rimless eyeglass frames include:

concave check, maximum radius check, minimum radius check, and minimum radius revision performed when the minimum R value is below a certain value.

23. The method for changing the type of eyeglass frames, according to claim 20, wherein said data revision operations for changing from said first type of semi-rimless eyeglass frames to said second type of full-rimmed eyeglass frames include:

determining closing block position, radius check for closing block position, and radius revision for closing block position performed when that R value is below a certain value.

24. The method for changing the type of eyeglass frames, according to claim 20, wherein said data revision operations and data addition operations are performed with computer simulation methods.

25. The method for changing the type of eyeglass frames, according to claim 24, wherein an image of the eyeglasses worn on the face is generated and displayed on a display screen, by capturing a face image of the eyeglass consumer and laying an eyeglass frame image, according to data relating to said eyeglass frames, over the face image; and said data revision operations and data revision operations are performed on screen, in the case where data revision operations and data addition operations are performed with computer simulation methods.

* * * * *

UNITED STATES PATENT AND TRADEMARK OFFICE
CERTIFICATE OF CORRECTION

PATENT NO.      : 6,533,418 B1
DATED           : March 18, 2003
INVENTOR(S)     : Yukihiro Izumitani et al.

It is certified that error appears in the above-identified patent and that said Letters Patent is hereby corrected as shown below:

<u>Title page, Item [54] and Column 1, lines 1 and 2,</u>
Change title from "SYSTEM FOR MAKING SPECTACLES TO ORDER" to
-- EYEGLASSES MADE-TO-ORDER SYSTEM --.

Signed and Sealed this

Second Day of September, 2003

JAMES E. ROGAN
*Director of the United States Patent and Trademark Office*